US007106903B2

(12) United States Patent
Chang et al.

(10) Patent No.: US 7,106,903 B2
(45) Date of Patent: Sep. 12, 2006

(54) DYNAMIC PARTIAL FUNCTION IN MEASUREMENT OF SIMILARITY OF OBJECTS

(75) Inventors: Edward Y. Chang, Santa Barbara, CA (US); Beitao Li, Goleta, CA (US)

(73) Assignee: VIMA Technologies, Inc., Santa Barbara, CA (US)

( * ) Notice: Subject to any disclaimer, the term of this patent is extended or adjusted under 35 U.S.C. 154(b) by 587 days.

(21) Appl. No.: 10/255,158

(22) Filed: Sep. 24, 2002

(65) Prior Publication Data

US 2003/0088387 A1 May 8, 2003

Related U.S. Application Data

(60) Provisional application No. 60/324,766, filed on Sep. 24, 2001, provisional application No. 60/361,162, filed on Mar. 1, 2002.

(51) Int. Cl.
*G06K 9/46* (2006.01)
*G06K 9/54* (2006.01)
*G06F 7/00* (2006.01)

(52) U.S. Cl. ............................ 382/190; 382/305; 707/3

(58) Field of Classification Search ................ 382/162, 382/173, 190, 191, 195, 276, 168, 305; 707/3–6; 703/12
See application file for complete search history.

(56) References Cited

U.S. PATENT DOCUMENTS 5,559,895 A * 9/1996 Lee et al. .................... 382/119
5,642,294 A * 6/1997 Taniguchi et al. ........... 348/700
5,652,829 A * 7/1997 Hong ........................... 706/59
6,295,514 B1 * 9/2001 Agrafiotis et al. ............ 703/12
6,704,725 B1 * 3/2004 Lee ................................ 707/4

OTHER PUBLICATIONS

C. C. Aggarwal et al., "On the Surprising Behavior of Distance Metrics in High Dimensional Space", LNCS 1973, pp. 420-431, ICDT Conference Proceedings, 2001.
E. Y. Chang et al., "Toward Perception-Based Image Retrieval", IEEE, Content-Based Access of Image and Video Libraries, pp. 101-105, Jun. 2000.
M. Flickner et al., "Query by Image and Video Content: The QBIC System", IEEE Computer, 28 (9): 23-32, Sep. 1995.
J. Flusser et al., "On the Calculation of Image Moments", research report No. 1946, Jan. 1999, 12 pgs.
R. L. Goldstone, "Similarity, Interactive Activation and Mapping", Journal of Experimental Psychology: Learning, Memory, and Cognition, 1994, vol. 20, No. 1, pp. 3-28.
A. Hinneburg et al., "What is the nearest neighbor in high dimensional spaces?", VLDB Journal, pp. 506-515, 2000.

(Continued)

*Primary Examiner*—Kanjibhai Patel
(74) *Attorney, Agent, or Firm*—Morrison & Foerster LLP

(57) ABSTRACT

A method of measuring similarity of a first object represented by first set of feature values to a second object represented by a second set of feature values, comprising determining respective feature distance values between substantially all corresponding feature values of the first and second sets of feature values, selecting a subset of the determined feature distance values in which substantially all feature distance values that are selected to be within the subset are smaller in value than feature distance values that are not selected to be within the subset, and summing the feature distance values in the subset to produce a partial feature distance measure between the first and second objects.

22 Claims, 13 Drawing Sheets

OTHER PUBLICATIONS

K. A. Hua et al., "SamMatch: A Flexible and Efficient Sampling - Based Image Retrieval Technique for Large Image Databases", Proceedings of ACM Multimedia, Nov. 1999, pp. 225-234.

Y. Ishikawa et al., "MindReader: Querying databases through multiple examples", VLDB, 1998, pp. 218-227.

JiaGuu Leu, "Computing a Shape's Moments from its Boundary", Pattern Recognition, vol. 24, No. 10, 1991, pp. 949-957.

J. Li et al., "IRM: Integrated Region Matching for Image Retrieval", Proceedings ACM Multimedia 2000, LA, CA, Oct. 30-Nov. 4, 2000, pp. 147-156.

D. L. Medin et al., "Respects for Similarity", Psychological Review, 1993, vol. 100, No. 2, pp. 254-278.

G. L. Murphy et al., "The Role of Theories in Conceptual Coherence", Psychological Review, vol. 92, No. 3, Jul. 1985.

M. Ortega et al., "Supporting Similarity Queries in MARS", Proc. of ACM Conf. on Multimedia, 1997, pp. 403-413.

K. Porkaew et al., "Query Reformulation for Content Based Multimedia Retrieval in MARS", IEEE 1999, pp. 747-751.

M. W. Richardson, "Multidimensional Psychophysics", Psychological Bulletin, 35:659-660, 1938.

J. R. Smith et al., "Automated Image Retrieval Using Color and Texture", Columbia University Technical Report TR# 414-95-20, Jul. 1995, 27 pgs.

J. R. Smith, "Integrated Spatial and Feature Image Systems: Retrieval, Analysis and Compression", Columbia University PhD Thesis, 1997.

J. R. Smith et al., "Tools and Techniques for Color Image Retrieval", SPIE vol. 2670, 1996, pp. 426-437.

H. Tamura et al., "Textural Features Corresponding to Visual Perception", IEEE 1978, pp. 460-473.

A. Tversky et al., "Features of Similarity", Psychological Review, vol. 84, No. 4, Jul. 1977, pp. 327-353.

X. S. Zhou et al., "Comparing Discriminating Transformations and SVM for Learning during Multimedia Retrieval", Pros of ACM Conf. on Multimedia, pp. 137-146, 2001.

B. A. Wandell, "Foundations of Vision", Stanford University, 1995, book.

I. H. Witten et al., "Managing Gigabytes", Van Nostrand Reinhold N.Y. publisher, 1994, book.

P. Wu et al., "A texture descriptor for browsing and similarity retrieval", Signal Processing Image Communication 16 (2000) 33-43.

G. Salton editor, The Smart Retrieval System Experiments in Automatic Document Processing, Prentice-Hall, Inc. New Jersey, 1971, book.

* cited by examiner

DYNAMIC PARTIAL FUNCTION IN MEASUREMENT OF SIMILARITY OF OBJECTS

CROSS-REFERENCE TO RELATED APPLICATIONS

This application claims priority to and the benefit of the filing date of provisional patent application Ser. No. 60/324,766 filed Sep. 24, 2001 and provisional patent application Ser. No. 60/361,162 filed Mar. 1, 2002.

BACKGROUND OF THE INVENTION

1. Field of the Invention

The invention relates in general to use of object features to ascertain a perceptual distance between the objects.

2. Description of the Related Art

Perceptual distance means a quantitative-based measure of human perception on similarity between objects. Research in content-based image/video retrieval has steadily gained momentum in recent years as a result of the dramatic increase in the volume of digital images and videos. To achieve effective retrieval, an image/video system should be able to accurately characterize and quantify perceptual similarity. However, a fundamental issue—how to best measure perceptual similarity—remains a challenge. Various perceptual distance measurements, such as the Minkowski metric (See, M. W. Richardson, Multidimensional psychophysic, *Psychological Bulletin*, 35:659–660, 1938 (including the recently proposed fractional distance, C. C. Aggarwal, A. Hinneburg, and D. A. Keim, on the surprising behavior of distance metrics in high dimensional space, *ICDT Conference Proceedings*, 2001)), histogram Cosine distance (See, I. Witten, A. Moffat, and T. Bell, *Managing Gigabytes: Compressing and Indexing Documents and Images*, Van Nostrand Reinhold, New York, N.Y., 1994.), and fuzzy logic (See, J. Li, J. Z. Wang, and G. Wiederhold. Irm: Integrated region matching for image retrieval. *Proceedings of ACM Multimedia*, October 2000), have been used to measure similarity between feature vectors representing images (and hence video frames). A problem addressed by these distance measurement processes has been to accurately measure the degree to which objects are perceptually similar to each other. Conversely, the same problem can be characterized as accurately measuring the degree to which objects are perceptually different from each other.

The Minkowski metric is one example of a process that has been used in the past for measuring similarity between objects (e.g., images). Suppose two objects X and Y are represented by two p dimensional vectors (or expressions) $(x_1, x_2, \ldots, x_p)$ and $(y_1, y_2, \ldots, y_p)$, respectively. The Minkowski metric $d(X, Y)$ is defined as:

$$d(X, Y) = \left(\sum_{i=1}^{p} |x_i - y_i|^r\right)^{\frac{1}{r}} \quad (1)$$

where r is the Minkowski factor for the norm. Particularly, when r is set as 2, it is the well known Euclidean distance; when r is 1, it is the Manhattan distance (or $L_1$ distance); when r is set to less than 1, it is the fractional distance. An object located a smaller distance from a query object is deemed more similar to the query object. Measuring similarity by the Minkowski metric is based primarily on the assumption that similar objects should be similar to the query object in all features.

Parameter r can also help determine the separation between similar objects and dissimilar objects. In principle, in high dimensional spaces, r should be small (e.g., less than one). In low dimensional space, r can be large (e.g., 2 or 3).

In other words, parameter r is a scaling factor, which optimal value is dataset dependent, and can be learning from the way that we learn m.

We try different r values and pick the r that can achieve the maximum separation for similar and dissimilar objects.

A variant of the Minkowski function, the weighted Minkowski distance function, has also been applied to measure image similarity. The basic idea is to introduce weighting to identify important features. Assigning each feature a weighting coefficient $w_i$ (i=1 . . . p), the weighted Minkowski distance function is defined as:

$$d_w(X, Y) = \left(\sum_{i=1}^{p} w_i |x_i - y_i|^r\right)^{\frac{1}{r}}. \quad (2)$$

By applying a static weighting vector for measuring similarity, the weighted Minkowski distance function assumes that similar images resemble the query images in the same features. For example, when the function weights color features high and ignores texture features, this same weighting is applied to all pair-wise distance computation with the query image.

The weighted Minkowski function, described by J. Rocchio, Relevance feedback in information retrieval, In G. Salton, editor, *The SMART retrieval system: Experiments in automatic document processing*, Prentice-Hall, 1971, and the quadratic-form distances described by M. Flickner, H. Sawhney, J. Ashley, Q. Huang, B. Dom, M. Gorkani, J. Hafner, D. Lee, D. Petkovic, D. Steele, and P. Yanker, Query by image and video content: The QBIC system, *IEEE Computer*, 28(9):23–32, 1995, and by, Y. Ishikawa, R. Subramanya, and C. Faloutsos, Mindreader: Querying databases through multiple examples, *VLDB*, 1998, are the two representative distance functions that match the spirit of Equation (3). The weights of the distance functions can be learned via techniques such as relevance feedback. See, K. Porkaew, S. Mehrota, and M. Ortega, Query reformulation for content based multimedia retrieval in mars, *ICMCS, pages* 747–751, 1999, and J. Rocchio, Supra, and discriminative analysis. See, X. S. Zhou and T. S. Huang, Comparing discriminating transformations and SVM for learning during multimedia retrieval, *Pros. of ACM Conf. on Multimedia*, pages 137–146, 2001. Given some similar and some dissimilar objects, the weights can be adjusted so that similar objects can be better distinguished from other objects.

An assumption made by these distance functions is that all similar objects are similar in the same respects. See, X. S. Zhou and T. S. Huang, Comparing discriminating transformations and SVM for learning during multimedia retrieval, *Pros. of ACM Conf. on Multimedia*, pages 137–146, 2001. Specifically, a Minkowski-like metric accounts for all feature channels when it is employed to measure similarity. However, there are a large number of counter-examples demonstrating that this assumption is questionable. For instance, the psychology studies of D. L. Medin, R. L. Goldstone, and D. Gentner, Respects for similarity, *Psychological Review*, 100(2):254–278, 1993, and A. Tversky, Feature of similarity, *Psychological Review*, 84:327–352, 1977, present examples showing that the Minkowski model appears to run counter to human perception of similarity.

Substantial work on similarity has been carried out by cognitive psychologists. The most influential work is perhaps that of Tversky, Id., who suggests that similarity is determined by matching features of compared objects, and integrating these features by the formula, $$S(A, B)=\theta f(A \cap B)-\alpha f(A-B)-\beta f(B-A) \quad (3)$$

The similarity of A to B, S(A, B), is expressed as a linear combination of the common and distinct features. The term (A∩B) represents the common features of A and B. (A−B) represents the features that A has but B does not; (B−A) represents the features that B has but A does not. The terms θ, α, and β reflect the weights given to the common and distinctive components, and function f is often assumed to be additive, see, D. L. Medin, R. L. Goldstone, and D. Gentner, Supra.

Murphy and Medin, (See, G. Murphy and D. Medin, The role of theories in conceptual coherence, *Psychological Review*, 92:289–316, 1985), provide early insights into how similarity works in human perception: "The explanatory work is on the level of determining which attributes will be selected, with similarity being at least as much a consequence as a cause of a concept coherence." Goldstone (See, R. L. Goldstone, Similarity, interactive activation, and mapping, *Journal of Experimental Psychology: Learning, Memory, and Cognition*, 20:3–28, 1994), explains that similarity is the process that determines the respects for measuring similarity. In other words, a distance function for measuring a pair of objects is formulated only after the objects are compared, not before the comparison is made. The relevant respects for the comparison are identified in this formulation process. The identified respects are more likely to be those that can support coherence between the compared objects. Although Goldstone had the right intuition, no one has been able to formulate a process that can measure similarity by selecting features in a partial and dynamic way.

Thus, there has been a recognized need for improvements in measurement of perceptual distance between objects. The present invention meets this need.

DETAILED DESCRIPTION OF THE PREFERRED EMBODIMENTS

In one aspect, the present invention provides improvements in measurement of perceptual distance between objects that can be represented by vectors comprising individual features (or channels) that can be quantified. The following description is presented to enable any person skilled in the art to make and use the invention. The embodiments of the invention are described in the context of particular applications and their requirements. These descriptions of specific applications are provided only as examples. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 13A:
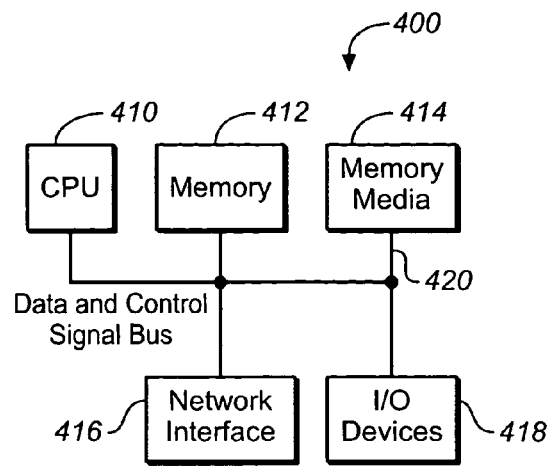
FIG. 13(a) is an illustrative schematic drawing of an exemplary single computer hardware enviromnent for implementing an image or video frame comparison system.
Figure 13B:
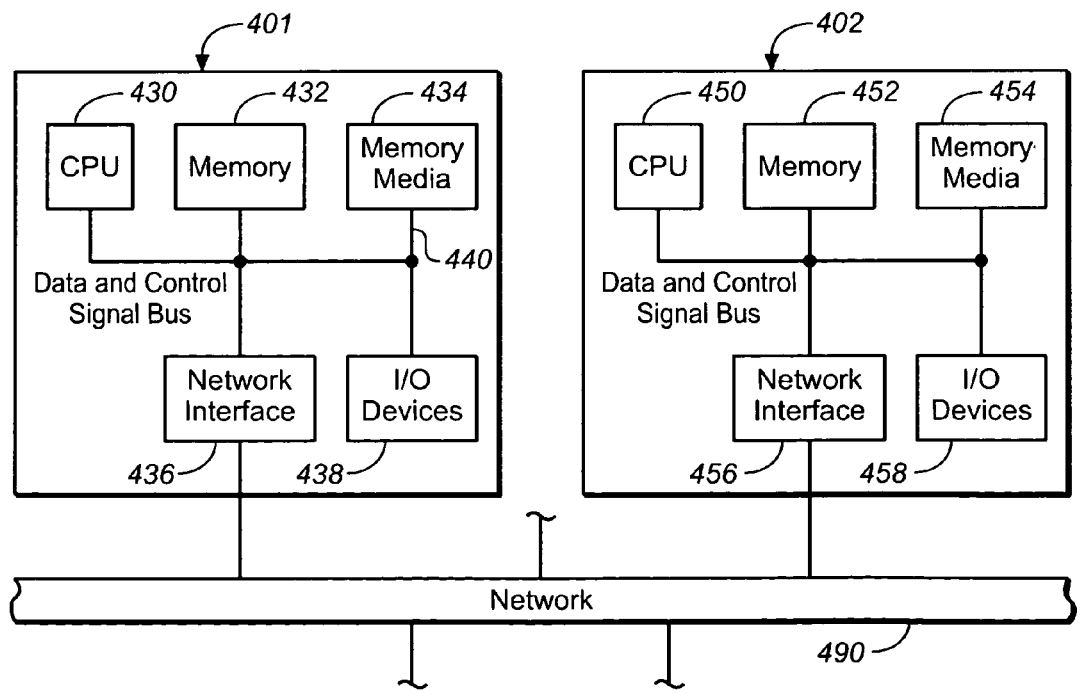
FIG. 13(b) is an illustrazive schematic drawing of an exemplary multiple computer hardware system environment for implementing an image or video frame comparison system.

One embodiment of the present invention provides a method of measuring similarity of a first object represented by first set of feature values to a second object represented by a second set of feature values. This method can be implemented in computer software using a general purpose computer such that illustrated in FIGS. 13(a)–(b). Also, of course, the invention encompasses a general purpose computer system such as that sown in FIGS. 13(a)–(b) programmed to perform the method of the invention. The process involves determining respective feature distance values between substantially all corresponding feature values of the first and second sets of feature values. The words 'substantially all' are used since the novel process can work even if feature distance between some corresponding features are not determined, provided that a sufficient number of features distances are determined so that distance measurement performance is not significantly degraded to an insubstantial degree. A subset of the determined feature distance values is selected such that substantially all feature distance values that are selected to be within the subset are smaller in value than feature distance values that are not selected to be within the subset. Again, the words 'substantially all' are used since the novel process can work even if some features are included that do not strictly meet the smaller than requirement, provided that the number is small enough so that distance measurement performance is not degraded to an insubstantial degree. The feature distance values in the subset are summed to produce a partial feature distance measure between the first and second objects.

It will be appreciated that the steps of (1) determining respective feature distance values; (2) selecting a subset of the determined feature distance values; and (3) summing the feature distance values in the subset to produce a partial feature distance measure, all can be implemented using a computer program module encoded in computer readable memory useable by the system of FIGS. 13(a)–(b). Moreover, it will be appreciated that the processes disclosed herein for selecting values for m and the processes for selecting values for a threshold feature distance value also can be implemented using a programmed computer and can encode computer code encoded in a computer readable memory medium.

In a present embodiment of the invention, perceptual distance between image objects is measured. However, the principles of the invention apply to any objects that can be represented by a collection of features (or attributes) that can be individually quantified or represented in a set (or vector). A perceptual distance can be measured between any two such objects that can be represented in such a manner. Image objects represent just once example embodiment.

1. Mining Image Feature Set

This section depicts how the mining dataset was constructed in three steps: testbed setup, feature extraction, and feature selection.

The purpose of the experiment is to examine the distance patterns between similar image and the distance patterns between dissimilar images, and to identify differences in the pattern so that we can gain insights for deriving a better distance function.

1.1 Image Testbed Setup

To ensure that sound inferences can be drawn from our mining results, we carefully construct the dataset. First, we prepare for a dataset that is comprehensive enough to cover a diversified set of image objects. To achieve this goal, we collect 60,000 JPEG images from Corel CDs and from the Internet. Second, we define "similarity" in a slightly restrictive way so that individuals' subjectivity can be excluded. For each image in the 60,000-image set, we perform 24 transformations (described shortly), and hence form 60,000 similar-image sets. The total number of images in the testbed is 1.5 million.

We have considered adding images taken under different lighting conditions or with different camera parameters. We decided not to include them because they cannot be automatically generated from an image. Nevertheless, our experimental results show that the perceptual distance function discovered during the mining process can be used effectively to find other perceptually similar images. In other words, our testbed consists of a good representation of similar images, and the mining results (i.e., training results) can be generalized to testing data consisting of perceptually similar images produced by other methods.

The 24 image transformations we perform include the following:

1. Scaling.
    Scale up then down. We scale each image up by 4 and 16 times, respectively, and then scale it back to the original size.
    Scale down then up. We scale each image down by factors of 2, 4, and 8, respectively, then scale it back to the original size.
2. Downsampling. We downsample each image by seven different percentages: 10%, 20%, 30%, 40%, 50%, 70%, and 90%.
3. Cropping. We evenly remove the outer borders to reduce each image by 5%, 10%, 20%, 30%, 40%, 50%, 60%, and 70%, respectively, and then scale it back up to the original size.
4. Rotation. We rotate each image by 90, 180, and 270 degrees.
5. Format transformation. We obtain the GIF version of each JPEG image.

Basically, a seed image is transformed 24 different ways as described above to produce 24 different versions of the same image. The transformations are performed in such a manner that an ordinary user can recognize that each transformed image corresponds to the original seed image. Following the transformation of the seed image, there are a total of 25 images corresponding to such seed image, the original seed image and the 25 transformation images. A feature set (or vector) is produced for each of these 25 images. Therefore, a plurality of transform images and a plurality of transform feature sets is produced for each seed image and for each seed image feature set. This basic process was performed for each of approximately 60,000 seed images. Thus, a multiplicity of seed images and seed feature sets were transformed into a corresponding multiplicity of transform images and transform image sets. The result is approximately 1.5M images and corresponding feature sets used in our experiment.

By carefully creating the transform images as described above, we developed for the experiment a universe of images (seed and transform) in which each seed image was more similar to its 24 transform images than it was to any other seed image or to any other transform image. As such, the experiment could use these seed and transform images to test the efficacy of different perceptual distance measurement techniques. In short, the seed image was used as a target (or query) image against which the other approximately 1.5M seed and transform images could be measured for perceptual distance. It was assumed that for any given seed image, the best perceptual distance measurement function would be most effective at successfully identifying the 24 transform images produced from that given seed image as perceptually closest to the seed image.

1.2 Image Features

To describe images, we must find a set of features that can represent those images adequately. Finding a universal representative feature set can be very challenging, since different imaging applications may require different feature sets. For instance, the feature set that is suitable for finding tumors may not be effective for finding landscape images, and vice versa. However, we believe that by carefully separating perception from intelligence (i.e., domain knowledge), we can identify meaningful perceptual features independent of their imaging applications.

Psychologists and physiologists divide the human visual system into two parts: the perceivingpart, and the inference part. See, B. Wandell, *Foundations of Vision*, Sinauer, 1995. The perceiving part receives photons, converts electrical signals into neuro-chemical signals, and delivers the signals to our brains. The inference part then analyzes the perceived data based on our knowledge and experience. A baby and an adult have equal capability for perceiving, but differing capability for understanding what is perceived. Among adults, specially trained ones can interpret an X-ray film, but the untrained cannot. In short, the perceiving part of our visual system is task-independent, so it can be characterized in a domain-independent manner.

In our experiments, we extract features such as color, shape, and texture from images. In the color channel, we characterize color in multiple resolutions. We first divide color into 12 color bins including 11 bins for culture colors and one bin for outliers (See, K. A. Hua, K. Vu, and J.-H. Oh, Sammatch: A flexible and efficient sampling-based image retrieval technique for image databases, *Proceedings of ACM Multimedia*, November 1999). At the coarsest resolution, we characterize color using a color mask of 12 bits. To record color information at finer resolutions, we record nine additional features for each color. These nine features are color histograms, color means (in II, S and V channels), color variances (in II, S and V channels), and two shape characteristics: elongation and spreadness. Color elongation characterizes the shape of a color, and spreadness characterizes how that color scatters within the image (See, J.-G. Leu, Computing a shape's moments from its boundary, *Pattern Recognition*, pages Vol. 24, No. 10, pp. 949–957, 1991). Table 1 summarizes color features in coarse, medium and fine resolutions.

Texture is an important characteristic for image analysis. Studies have shown that characterizing texture features in terms of structuredness, orientation, and scale (coarseness) fits well with models of human perception. For example, see, W. Y. Ma and H. Zhang, Benchmarking of image features for content-based retrieval, *Proceedings of Asilomar Conference on Signal, Systems & Computers*, 1998 and B. Manjunath, P. Wu, S. Newsam, and H. Shin, A texture descriptor for browsing and similarity retrieval, *Signal Processing Image Communication*, 2001 and J. Smith and S.-F. Chang, Automated image retrieval using color and texture, *IEEE Transaction on Pattern Analysis and Machine Intelligence*, November 1996 also see H. Tamura, S. Mori, and T. Yamawaki, Texture features corresponding to visual perception, *IEEE Transaction on Systems Man Cybernet (SMC)*, 1978. From the wide variety of texture analysis methods proposed in the past we choose a discrete wavelet transformation (DWT) using quadrature mirror filters J. Smith and S.-F. Chang, Automated image retrieval using color and texture, *IEEE Transaction on Pattern Analysis and Machine Intelligence*, November 1996 because of its computational efficiency.

Each wavelet decomposition on a 2-D image yields four subimages: a ½×½ scaled-down image of the input image and its wavelets in three orientations: horizontal, vertical and diagonal. Decomposing the scaled-down image further, we obtain the tree-structured or wavelet packet decomposition. The wavelet image decomposition provides a representation that is easy to interpret. Every subimage contains information of a specific scale and orientation and also retains spatial information. We obtain nine texture combinations from subimages of three scales and three orientations. Since each subimage retains the spatial information of texture, we also compute elongation and spreadness for each texture channel.

Thus, each image object is characterized by a set of features. Individual features are represented by individual terms of an expression (or vector) that represents the image. The individual terms are calculated based upon constituent components of an image. For instance, in a present embodiment of the invention, the pixel values that comprise an image are processed to derive values for the features that characterize the image. For each image there is an expression (or vector) comprising a plurality of feature values. Each value represents a feature of the image. In a present embodiment, each feature is represented by a value between 0 and 1. Thus, each image corresponds to an expression comprising terms that represent features of the image.

The following Color Features Table and Texture Features Table represent the features that are evaluated for images in accordance with a present embodiment of the invention. The image is evaluated with respect to 11 recognized cultural colors (black, white, red, yellow, green, blue, brown, purple, pink, orange and gray) plus one miscellaneous color for a total of 12 colors. The image also is evaluated for vertical, diagonal and horizontal texture. Each image is evaluated for each of the twelve (12) colors, and each color is characterized by the nine (9) color features listed in the Color Table. Thus, one hundred and eight (108) color features are evaluated for each image. In addition, each image is evaluated for each of the thirty-six (36) texture features listed in the Texture Chart. Therefore, one hundred and forty-four (144) features are evaluated for each image, and each image is represented by its own 144 (feature) term expression.

TABLE 1

Color Features

Present %
Hue - average
Hue - variance
Saturation - average
Saturation - variance
Intensity - average
Intensity - variance
Elongation
Spreadness

TABLE 2

Texture Features

| | Coarse | Medium | Fine |
|---|---|---|---|
| Horizontal | Avg. Energy | Avg. Energy | Avg. Energy |
| | Energy Variance | Energy Variance | Energy Variance |
| | Elongation | Elongation | Elongation |
| | Spreadness | Spreadness | Spreadness |

TABLE 2-continued

Texture Features

|  | Coarse | Medium | Fine |
|---|---|---|---|
| Diagonal | Avg. Energy | Avg. Energy | Avg. Energy |
|  | Energy Variance | Energy Variance | Energy Variance |
|  | Elongation | Elongation | Elongation |
|  | Spreadness | Spreadness | Spreadness |
| Vertical | Avg. Energy | Avg. Energy | Avg. Energy |
|  | Energy Variance | Energy Variance | Energy Variance |
|  | Elongation | Elongation | Elongation |
|  | Spreadness | Spreadness | Spreadness |

The computation of values for the image features such as those described above is well known to persons skilled in the art.

Color set, histograms and texture feature extraction are described in John R. Smith and Shih-Fu Chang, Tools and Techniques for Color Image Retrieval, *IS&T/SPIE Proceedings*, Vol. 2670, Storage & Retrieval for Image and Video Database IV, 1996, which is expressly incorporated herein by this reference.

Color set and histograms as well as elongation and spreadness are described in E. Chang, B. Li, and C. L. Towards Perception-Based Image Retrieval. *IEEE, Content-Based Access of Image and Video Libraries*, pages 101–105, June 2000, which is expressly incorporated herein by this reference.

The computation of color moments is described in Jan Flusser and Tomas Suk, On the Calculation of Image Moments, Research Report No. 1946, January 1999, *Journal of Pattern Recognition Letters*, which is expressly incorporated herein by this reference. Color moments are used to compute elongation and spreadness.

There are multiple resolutions of color features. The presence/absence of each color is at the coarse level of resolution. For instance, coarsest level color evaluation determines whether or not the color red is present in the image. This determination can be made through the evaluation of a color histogram of the entire image. If the color red constitutes less than some prescribed percentage of the overall color in the image, then the color red may be determined to be absent from the image. The average and variance of hue, saturation and intensity (HVS) are at a middle level of color resolution. Thus, for example, if the color red is determined to be present in the image, then a determination is made of the average and variance for each of the red hue, red saturation and red intensity. The color elongation and spreadness are at the finest level of color resolution. Color elongation can be characterized by multiple (7) image moments. Spreadness is a measure of the spatial variance of a color over the image.

There are also multiple levels of resolution for texture features. Referring to the Texture Table, there is an evaluation of the coarse, middle and fine level of feature resolution for each of vertical, diagonal and horizontal textures. In other words, an evaluation is made for each of the thirty-six (36) entries in the Texture Features Table. Thus, for example, referring to the horizontal-coarse (upper left) block in the Texture Features Table, an image is evaluated to determine feature values for an average coarse-horizontal energy feature, a coarse-horizontal energy variance feature, coarse-horizontal elongation feature and a coarse-horizontal spreadness feature. Similarly, for example, referring to the medium-diagonal (center) block in the Texture Features Table, an image is evaluated to determine feature values for an average medium-diagonal energy feature, a medium-diagonal energy variance feature, medium-diagonal elongation feature and a medium-diagonal spreadness feature.

1.3 Feature Selection

Once the testbed is set up and relevant features extracted, we fix the distance function to examine various feature combinations. For the time being, we employ the Euclidean distance function to quantify the similarity between two feature vectors. We use the Euclidean function because it is commonly used, and it achieves acceptable results. (However, we will offer a replacement distance function for the Euclidean distance.)

Using different feature combinations, we employ the Euclidean function to find the distance rankings of the 24 images that are similar to the original image (i.e., the query image). If a feature set can adequately capture the characteristics of images, the 24 similar images should be among those closest to the query image. (In an ideal case, the 24 similar images should be the 24 images closest to the query image.)

Our experiments reveal that when only individual features (e.g., color histograms, color elongation, and color spreadness) are employed, the distance function cannot easily capture the similar images even among the top-100 nearest neighbors. For a top-100 query, all individual features suffer from a dismal recall lower than 30%. When we combine all color features, the top-100 recall improves slightly, to 45%. When both color and texture features are used, the recall improves to 60%.

At this stage, we can go in either of two directions to improve recall. One, we can add more features, and two, we can replace the Euclidean distance function. We will consider adding additional features in our future work. In this paper, we focus on finding a perceptual distance function that improves upon the Euclidean Function.

2. Development of the Dynamic Partial Function

We first examine two popular distance functions, described above in the 'Background' section, that are used for measuring image similarity: Minkowski function and weighted Minkowski functions described above with reference to equations (1) and (2). Building upon those foundations, we explain the heuristics behind our new distance function process which we term, *Dynamic Partial Function* (*DPF*).

2.1 Minkowski Metric and Its Limitations

Our experiments were designed to test an assumption underlying the Minkowski-metric, that similar images resemble the query images in the same features assumption. For this purpose, we carried out extensive data mining work on a 1.5M-image dataset introduced above. To better discuss our findings, we introduce a term we have found useful in our data mining work. We define the feature distance on the $i^{th}$ feature as $$\delta_i = |x_i - y_i| (i = 1, \ldots, p)$$

The expressions of Equation (1) and Equation (2) can be simplified into $$d(X, Y) = \left(\sum_{i=1}^{p} \delta_i^r\right)^{\frac{1}{r}} \text{ and } d_w(X, Y) = \left(\sum_{i=1}^{p} w_i \delta_i^r\right)^{\frac{1}{r}}$$

In our mining work, we first tallied the feature distances between similar images (denoted as $\delta^+$), and also those between dissimilar images (denoted as $\delta^-$). Since we normalized feature values to be between zero and one, the ranges of both $\delta^+$ and $\delta^-$ are between zero and one. FIG. 2 presents the distributions of $\delta^+$ and $\delta^-$. The x-axis shows the possible value of $\delta$, from zero to one. The y-axis (in logarithmic scale) shows the percentage of the features at different $\delta$ values.

The figure shows that $\delta^+$ and $\delta^-$ have different distribution patterns. The distribution of $\delta^+$ is much skewed toward small values (FIG. 1(a)), whereas the distribution of $\delta^-$ is more evenly distributed (FIG. 1(b)). We can also see from FIG. 1(a) that a moderate portion of $\delta^-$ is in the high value range ($\geq 0.5$), which indicates that similar images may be quite dissimilar in some features. From this observation, we infer that the assumption of the Minkowski metric is inaccurate. Similar images are not necessarily similar in all features.

Furthermore, we examined whether similar images resemble the query images in the same way. We tallied the feature distance ($\delta^+$) of the 144 features for different kinds of image transformations. FIGS. 2(a)–(d) present four representative transformations: GIF, cropped, rotated, and scaled. The x-axis of the figure depicts the feature numbers, from 1 to 144. The first 108 features are various color features, and the last 36 are texture features. FIGS. 2(a)–(d) show that various similar images can resemble the query images in very different ways. GIF images have larger $\delta^-$ in color features (the first 108 features) than in texture features (the last 36 features). In contrast, cropped images have larger $\delta^-$ in texture features than in color features. For rotated images, the $\delta^+$ in colors comes close to zero, although its texture feature distance is much greater. A similar pattern appears in the scaled and the rotated images. However, the magnitude of the $\delta^+$ of scaled images is very different from that of rotated images.

Our observations show that the assumptions made by the Minkowski and weighted Minkowski function are questionable.

Figure 1A:
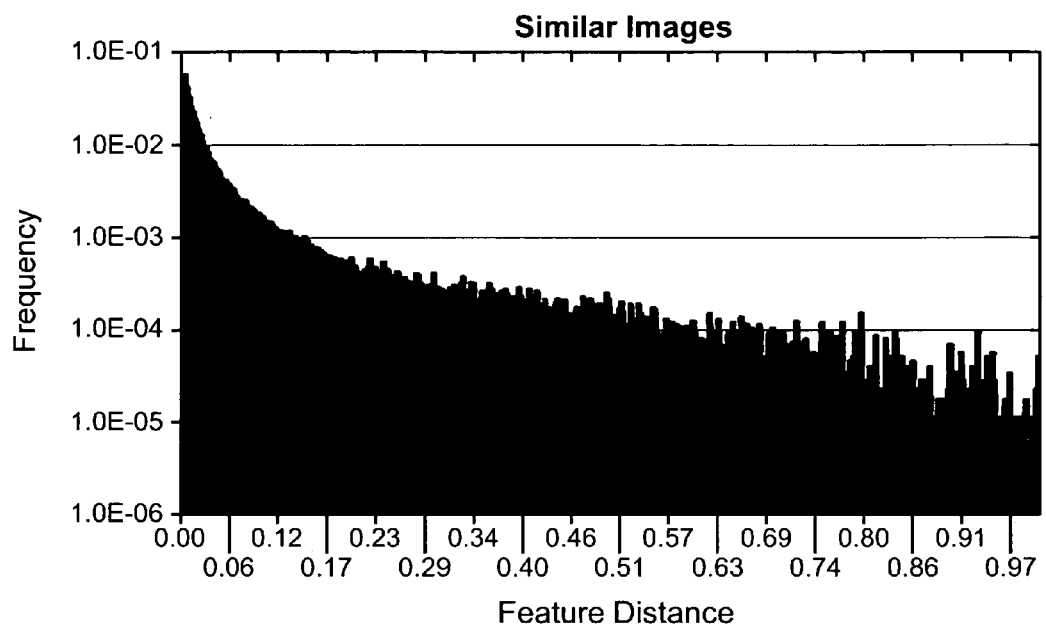
FIG. 1(a) depicts the distribution pattern of feature distances between exemplary similar images.
Figure 1B:
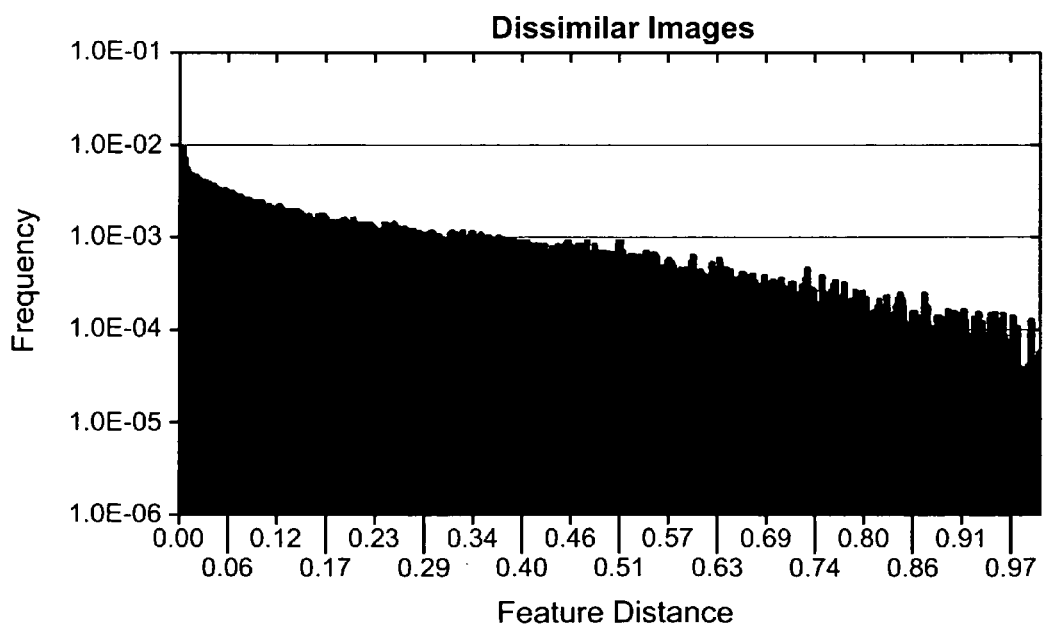
FIG. 1(b) depicts the distribution pattern of feature distances between exemplary dissimilar images.
Figure 2A:
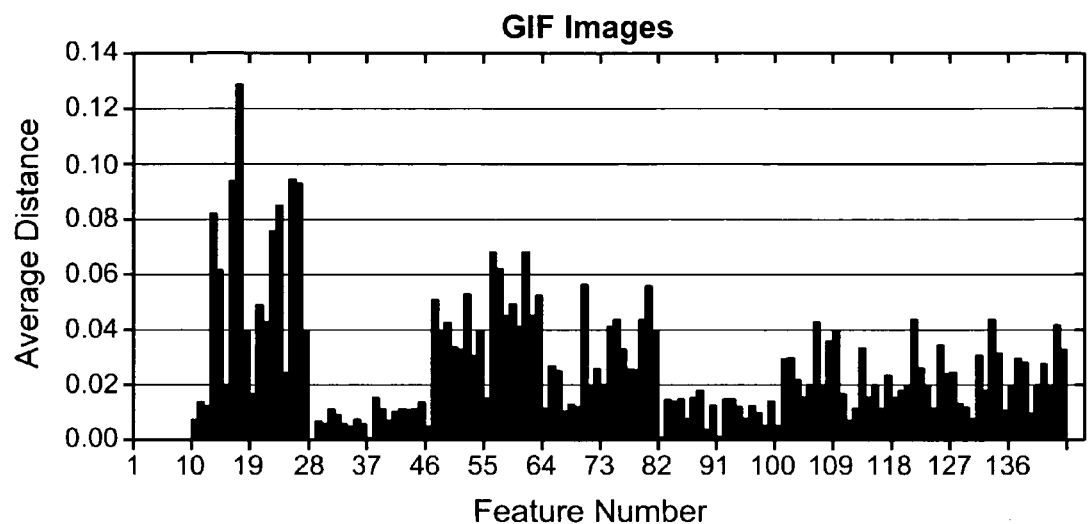
FIG. 2(a) depicts th. average feature distance associated with a kind of feature identified by a feature number in a representative GIF image transformation.
Figure 2B:
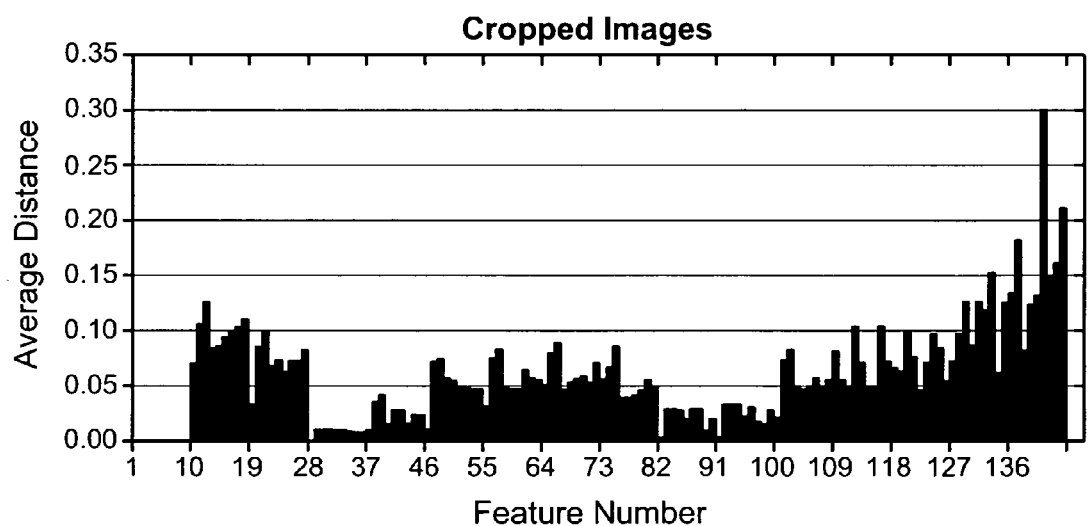
FIG. 2(b) depicts the average feature distance associated with a kind of feature identified by a feature number in a representative cropped image transfonnation.
Figure 2C:
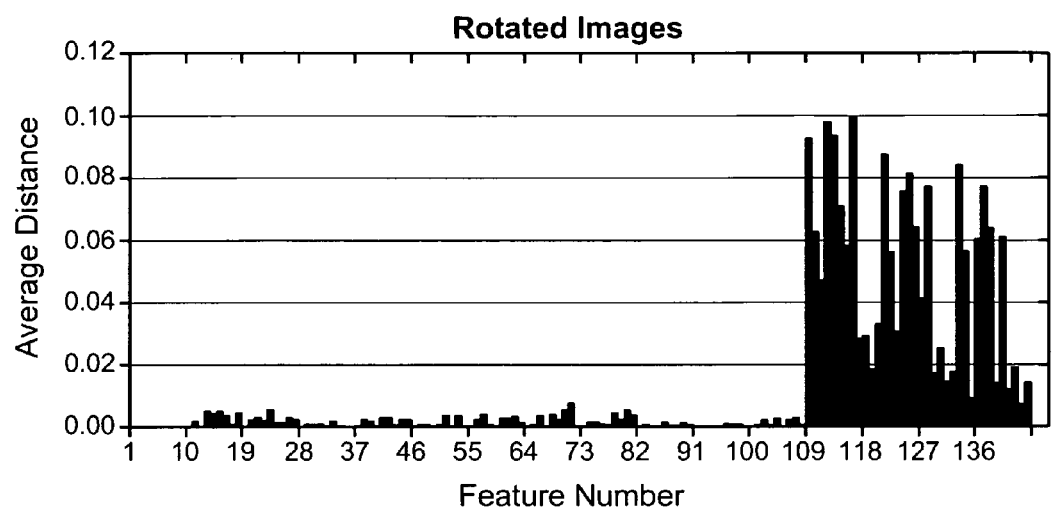
FIG. 2(c) depicts the average feature distance associated with a kind of feature identified by a feature number in a representative rotated image transformation.
Figure 2D:
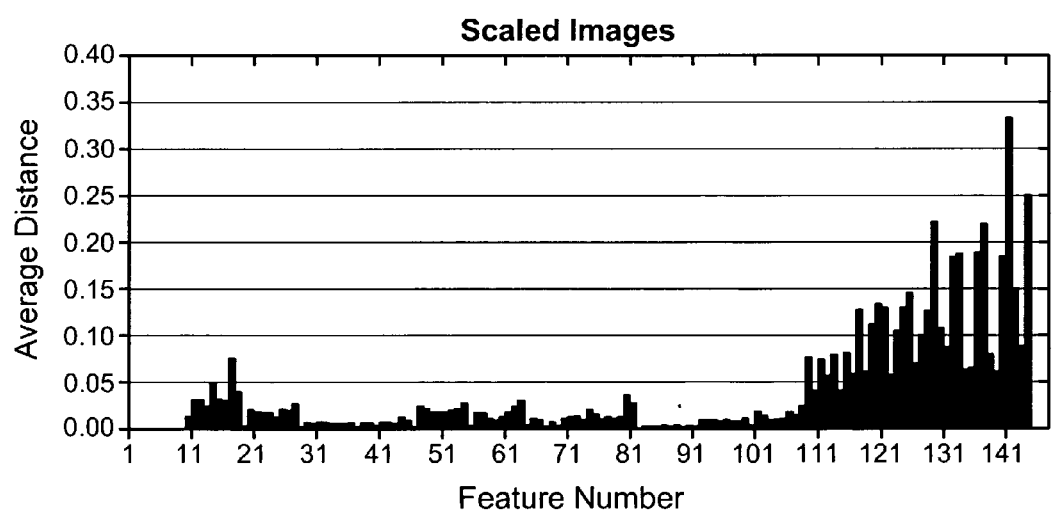
FIG. 2(d) depicts the average feature distance associated with a kind of feature identified by a feature number in a representative scaled image transformation.

1. Similar images do not resemble the query images in all features. FIGS. 1(a)–(b) show that similar images are different from a query image in many respects.
2. Images similar to the query images can be similar in differing features. FIGS. 2(a)–(d) show that some images resemble the query image in texture, others in color.

The above observations not only refute the assumptions of Minkowski-type distance functions, but also provide hints as to how a good distance function would work: It does not need to consider all features equally, since similar images may match only in some features. It should weight features dynamically, since various similar images may resemble the query image in differing ways.

These observations have led us to develop our novel dynamic partial distance function process.

Traditional relevance feedback methods learn a set "optimal" feature weighting for a query. For instance, if the user is more interested in color than in texture, color features are weighted higher when similarity is computed. What we have discovered here is that this "static" weighting is insufficient. An effective distance function should weigh features differently when comparing the query image to different images.

2.2 Dynamic Partial Function

Based on the observations explained above, we designed a distance function to better represent the perceptual similarity. Let $\delta_i = |x_i - y_i|$, for $i=1, \ldots, p$. We first define sets $\Delta_m$ as $\Delta_m = \{\text{The smallest } m\delta\text{'s of }(\delta_1, \ldots, \delta_p)\}$.

Then we define the Dynamic Partial Function (DPF) as $$d(m, r) = \left(\sum_{\delta_i \in \Delta_m} \delta_i^r\right)^{\frac{1}{r}} \quad (4)$$

DPF has two adjustable parameters: m and r. Parameter m can range from 1 to p. When m=p, it degenerates to the Minkowski metric. When m<p, it counts only the smallest m feature distances between two objects, and the influence of the (p−m) largest feature distances is eliminated. Note that DPF dynamically selects features to be considered for different pairs of objects. This is achieved by the introduction of $\Delta_m$, which changes dynamically for different pairs of objects. We will show that if a proper value of m is chosen, it is possible to make similar images aggregate more compactly and locate closer to the query images, simultaneously keeping the dissimilar images away from the query images. In other words, similar and dissimilar images are better separated by DPF than by earlier methods.

The idea employed by DPF can also be generalized to improve the weighted Minkowski distance function. We modify the weighted Minkowski distance by defining the weighted DPF as $$d_w(m, r) = \left(\sum_{\delta_i \in \Delta_m} w_i \delta_i^r\right)^{\frac{1}{r}} \quad (5)$$

2.3 How DPF Works

Given two feature vectors X and Y, which represent two distinct objects, many applications need to measure the similarity between these two objects through their feature representations X and Y. Suppose each object is represented by M features, we can write vectors X and Y as $X=(X_1, X_2, \ldots, X_p)$ and $Y=(Y_1, Y_2, \ldots, Y_p)$, respectively. Let us illustrate with a toy example. Suppose we have two images X and Y, and each is depicted by p=5 color features representing the percentage of black, white, red, green, and blue in the image. An example pair of X and Y can be X=(10, 10, 10, 10, 60) and Y=(0, 15, 10, 45, 35).

DPF measures similarity between X and Y in three steps
a. It first computes feature difference for each of the p features. Let $\delta_i$ denote the difference between $X_i$ and $Y_i$. We can write $\delta_i = |X_i - Y_i|$, where i=1 to p. In the above toy example, $\delta = (10, 5, 0, 35, 25)$.
b. DPF keeps only $\delta_i$'s that are small. There are at least two ways to determine which features to keep.
   1. Keep the smallest m (out of p) $\delta i$.
   2. Keep the $\delta_i$ that is smaller than a threshold feature distance value t.
   Go back to our example. If we set m=3, then we keep three features between X and Y. The three features to keep are i=1, 2, and 3. If we use the $2^{nd}$ method and set t=8, then DPF keeps two features i=2 and 3. In short, DPF keeps similar features and discards dissimilar features.
c. DPF computes the distance between two objects by summing the retained similar features.

Note very carefully that DPF is dynamic and partial.
Dynamic: DPF dynamically determines which features to keep only after two objects are compared, not before the objects are realized. Suppose we have another object Z=(30, 10, 20, 10, 20). Suppose we set m=3. The features that are used for comparing X and Z are i=2, 3, 4, and the features used for comparing Y and Z are i=2, 3, 5.

Partial: DPF uses only a subset of features out of p. Ddpf=Σ m $\delta_i$, where m<p 2.4 How DPF Differs from the Minkowski-Like Functions Minkowski-like functions uses all p features to compute similarity. The Minkowski function assumes all features must be considered in a similarity measure.
Dmk=Σ p $\delta_i$ 2.5 How DPF Differs from the Weighted Minkowski Function?

The weighted Minkowski function multiplies each feature by a weighting factor $w_i$. The key idea is that some features may be more important than the others and hence they should be weighted higher.
Dwmk=Σ p $w_i$ $\delta_i$ 2.6 Why DPF is Revolutionary?

DPF accurate characterizes how we (human beings) measure similarity. Let us use another simple example to illustrate. Suppose one is asked which city is similar to LA. Two possible answers can be SF and NY. LA is similar to SF because they are both in California, they are large cities, and they have earthquakes. LA is similar to NY because they have high crime rates, are big cities, and they are entertainment centers. Two key observations can be made here. One, a function that is used for measuring similarity is not pre-constructed. We do not have a function formulated until after the compared objects are realized. When we compare LA with SF, the similar features are activated, and the function is formulated. When we compare LA with NY, a different set of similar feature channels are activated, and a different function is formulated.

2.7 Why Minkowski Does not Work as Well?

Minkowski is not partial. Minkowski uses all features. If we force the "earthquake" feature in the formula that compares LA and NY, then they may not be similar.

Weighted Minkowki is not dynamic. If use the similar features between LA and SF to measure the similarity between LA and NY, LA and NY may not be similar. The features used for measuring similarity between any pair of objects are dynamically activated when the objects are realized.

3. Empirical Study

We conducted an empirical study to examine the effectiveness of DPF. Our experiments consisted of three parts.
1. We compared DPF with the Euclidean distance function, $L_1$ distance function, and the fractional function recently proposed by the database community, see C. C. Aggarwal, A. Hinneburg, and D. A. Keim, On the surprising behavior of distance metrics in high dimensional space, *ICDT Conference Proceedings*, 2001, and A. Hinneburg, C. C. Aggarwal, and D. A. Keim, What is the nearest neighbor in high dimensional spaces? In *The VLDB Journal*, pages 506–515, 2000. We also compared DPF with the histogram Cosine distance function, which is also commonly used in information retrieval, see J. R. Smith, *Integrated Spatial and Feature Image Systems: Retrieval, Analysis and Compression*, Columbia University PhD Thesis, 1997, and I. Witten, A. Moffat, and T. Bell, *Managing Gigabytes: Compressing and Indexing Documents and Images*, Van Nostrand Reinhold, New York, N.Y., 1994. The Cosine metric computes the direction difference between two feature vectors. Specifically, given two feature vectors x and y, the Cosine metric is given as $$D = 1 - \frac{x^T y}{|x||y|}$$

2. We tested whether DPF can be generalized to video shot-transition detection, the foundation of video analysis and retrieval applications.
3. In addition to the unweighted versions, we also examined whether the weighted DPF is effective for enhancing the performance of the weighted Minkowski distance function.

3.1 Image Retrieval

Our empirical study of image retrieval consisted of two parts: training and testing. In the training part, we used the 1.5M-image dataset to predict the optimal m value for DPF. In the testing part, we set DPF with the optimal m value, and tested it on all independently constructed 50K-image dataset to examine its effectiveness.

3.1.1 Predicting m Through Training

The design goal of DPF is to better separate similar images from dissimilar ones. To meet this design goal, we must judiciously select parameter m. (We take the Euclidean distance function as the baseline, thus we set r=2 for both DPF and the Minkowski distance function.).

Figure 3:
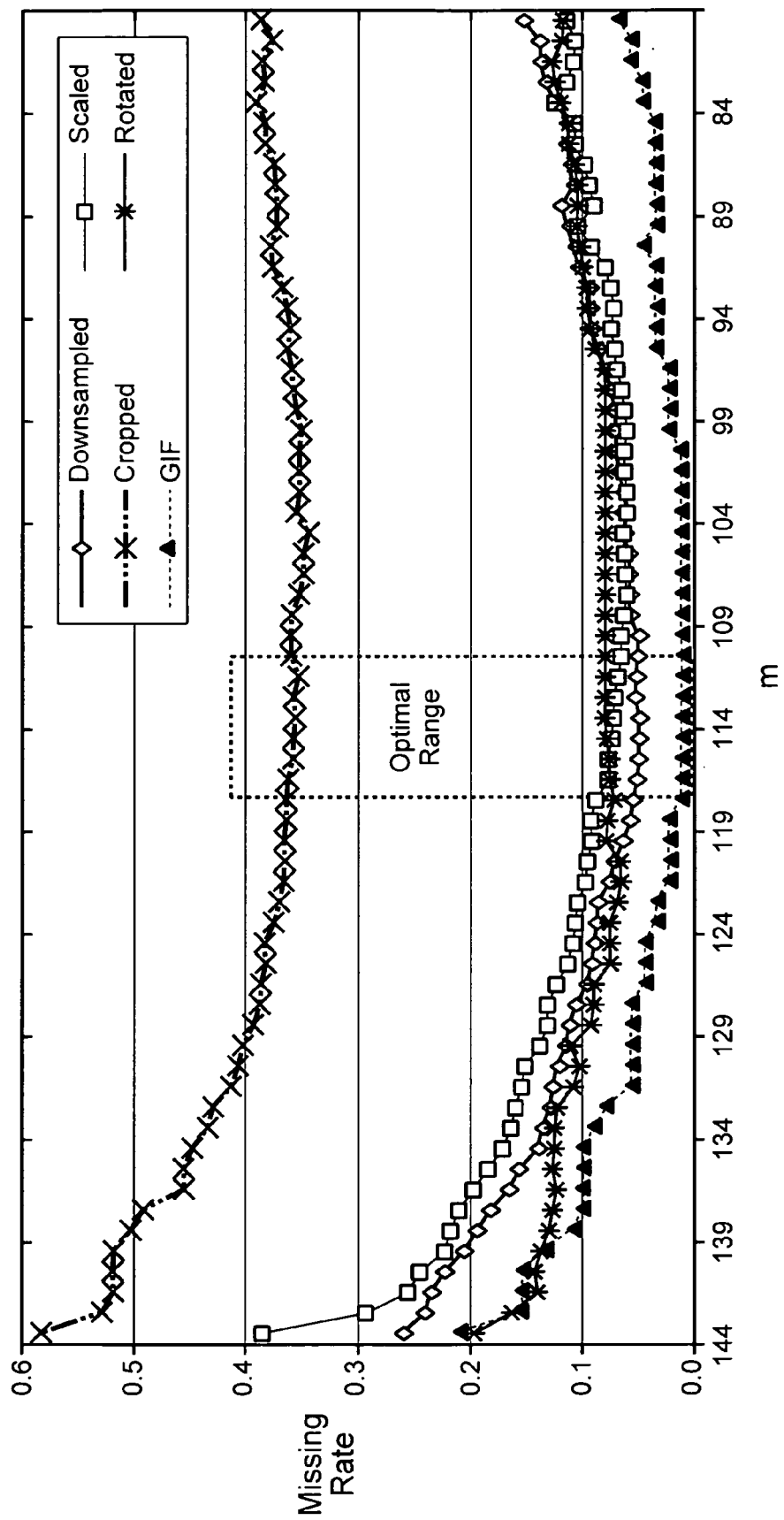
FIG. 3 compares the rate of missed images as it relates to the variable m, the number of feature distances used in DPF, of five similar image categories (ie., downsampled, cropped, GIF, scaled, and rotated).

To find the optimal m value, we used the 60,000 original images to perform queries. We applied DPF of different m values to the 1.5M-image dataset. The 24 images with the shortest distance from each query image were retrieved. For each of the five similar-image categories (i.e., GIF, cropped, downsampled, rotated, or scaled), we observed how many of them failed to appear in the top-24 results. FIG. 3 presents the average rate of missed images for each similar-image category. The figure shows that when m is reduced from 144 to between 110 and 118, the rates of missing are near their minimum for all five similar-image categories. (Note that when m=144, DPF degenerates into the Euclidean function.) DPF outperforms the Euclidean distance function by significant margins for all similar-image categories.

To investigate why DPF works effectively when m is reduced, we tallied the distances from these 60,000 queries to their similar images and their dissimilar images, respectively. We then computed the average and the standard deviation of these distances. We denote the average distance of the similar images to their queries as $\mu_d^+$, of the dissimilar images as $\mu_d^-$. We denote the standard deviation of the similar images' distances as $\sigma_d^+$, of the dissimilar images as $\sigma_d^-$.

Figure 4A:
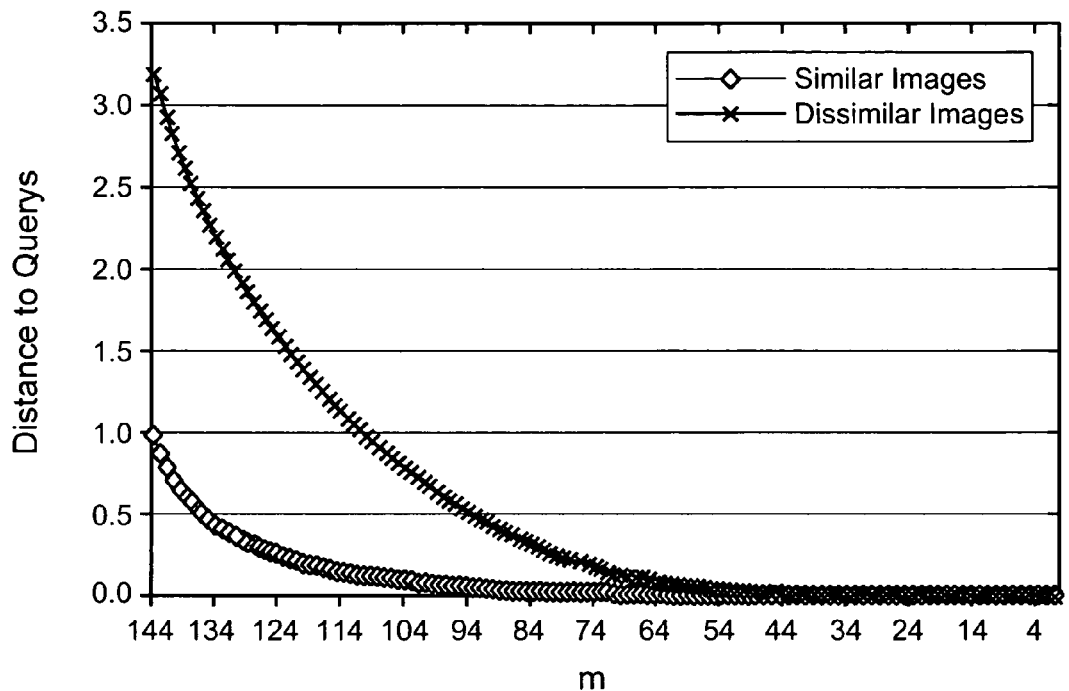
FIG. 4(a) compares the average feature distance related to a range of m-values of similar and dissimilar images queried to 60,000 original images.
Figure 4B:
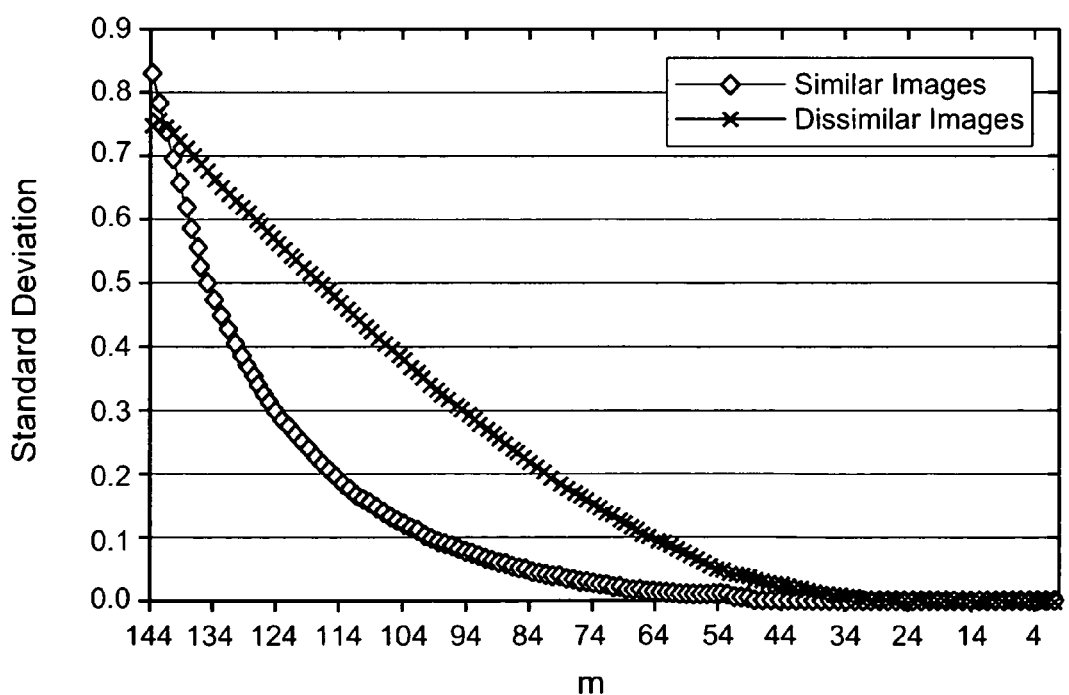
FIG. 4(b) compares the average standard deviation of feature distance related to a range of m-values of similar and dissimilar images queried to 60,000 original images.

FIGS. 4(a)–(b) depicts the effect of m (in the x-axis) on $\mu_d^+$, $\mu_d^-$, $\sigma_d^+$, and $\sigma_d^-$. FIG. 4(a) shows that as m becomes smaller, both $\mu_d^+$ and $\mu_d^-$ decrease. The average distance of similar images ($\mu_d^+$), however, decreases at a faster pace than that of dissimilar images ($\mu_d^-$). For instance, when we decrease m from 144 to 130, $\mu_d^+$ decreases from 1.0 to about 0.3, a 70% decrease, whereas $\mu_d^-$ decreases from 3.2 to about 2.0, a 38% decrease. This gap indicates $\mu_d^-$ is more sensitive to the m value than $\mu_d^+$. FIG. 4(b) shows that the standard deviations $\sigma_d^+$ and $\sigma_d^-$ observe the same trend as the average distances do. When m decreases, similar images become more compact in the feature space, at a faster pace than dissimilar images do.

Figure 5A:
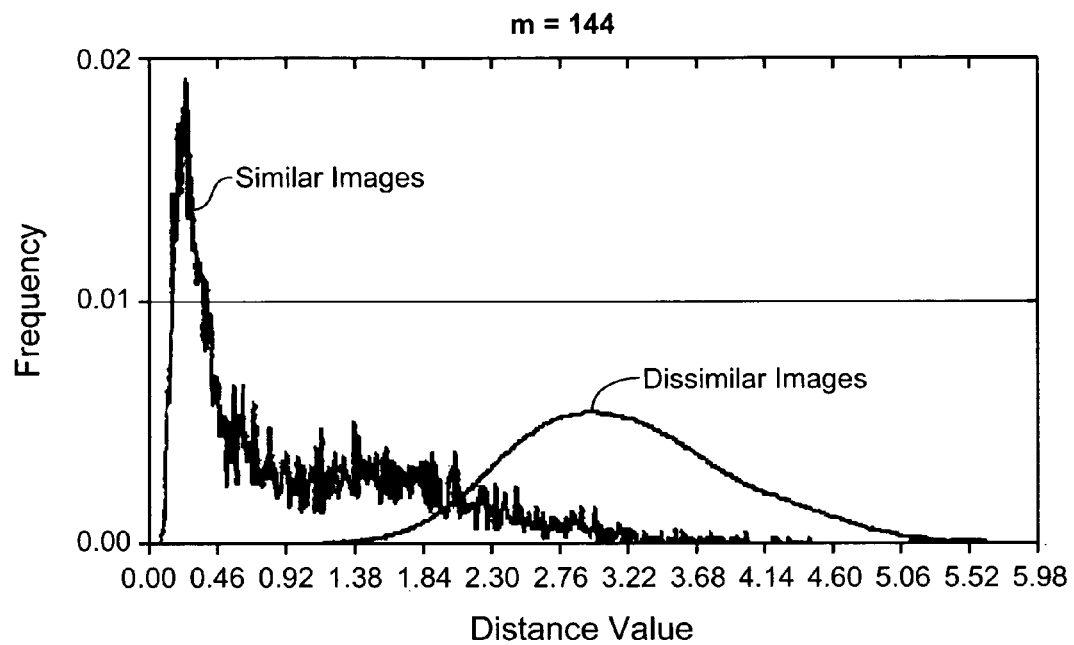
FIG. 5(a) depicts the overlap of feature distance distribution curves of similar and dissimilar images at m=144, when DPF degenerates into the Euclidean distance function.
Figure 5B:
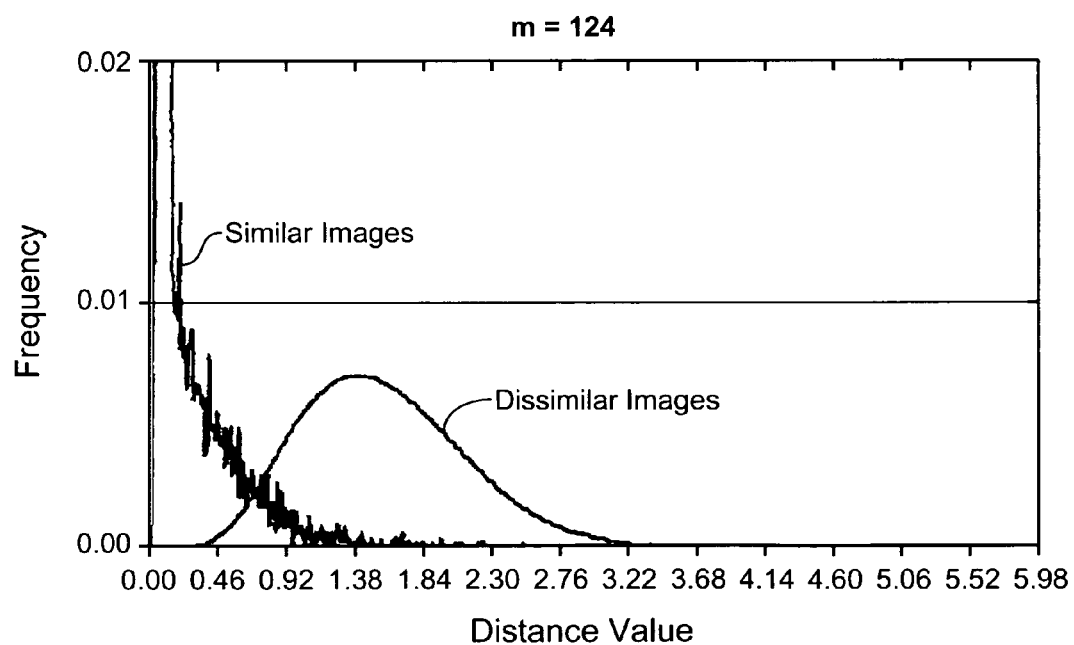
FIG. 5(b) depicts the feature distance distribution curves of similar and dissimilhrimages at m=124.
Figure 5C:
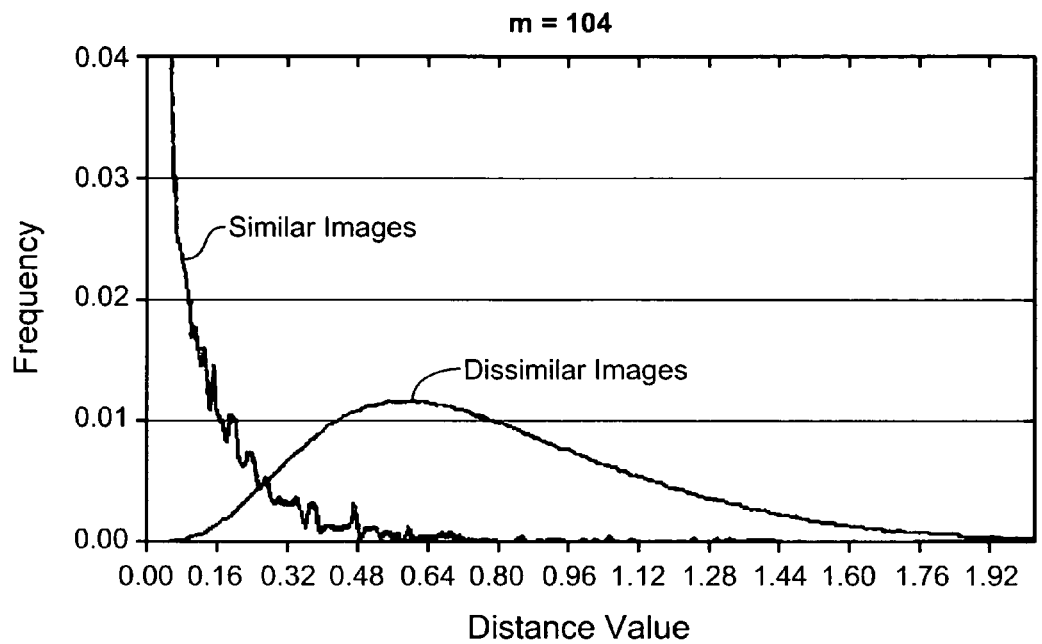
FIG. 5(c) depicts the feature distance distribution curves of similar and dissimilar images at m=104.
Figure 5D:
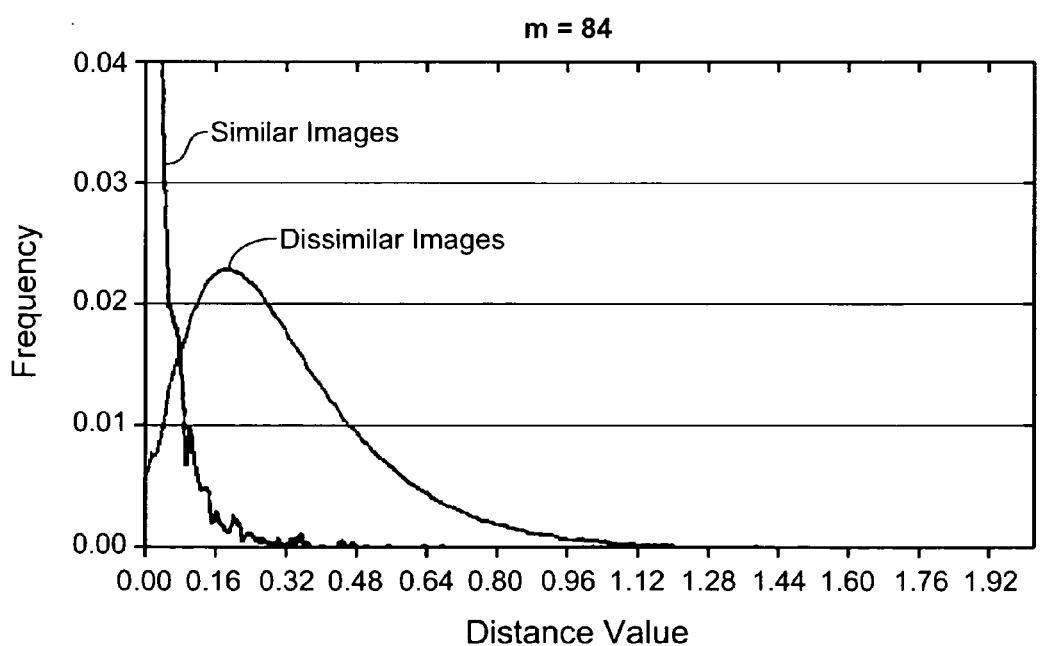
FIG. 5(d) depicts the feature distance distribution curves of similar and dissimilar images at m=84.

To provide more detailed information, FIGS. 5(a)–(d) depict the distance distributions at four different m values. FIG. 5(a) shows that when m=144, a significant overlap occurs between the distance distributions of similar and dissimilar images to the query images. (When m=144, DPF degenerates to the Euclidean function). In other words, many similar images and dissimilar images may reside about the same distance from their query image, which causes degraded search performance. When we decrease m to 124, FIG. 5(b) shows that both distributions shift toward the left. The distribution of similar images becomes more compact, and this leads to a better separation from dissimilar images. Further decreasing the m value moves both distributions leftward (as shown in FIGS. 5(c) and 5(d)). When little room is left for the distance distribution of similar images to move leftward, the overlap can eventually increase. Our observations from these figures confirm that we need to find the optimal m value to achieve best separation for similar and dissimilar images.

In a similar manner, an optimal threshold feature distance value described in Section 2.3 can be elected. Basically, a variety of threshold values are tested to ascertain which threshold value achieves the best results. The threshold selection process proceeds in the same way as the process described above for selecting our optimal value of m.

3.1.2 Testing DPF

We tested our distance functions on a dataset that was independently constructed from the 1.5M image dataset used for conducting mining and parameter training.

Figure 6:
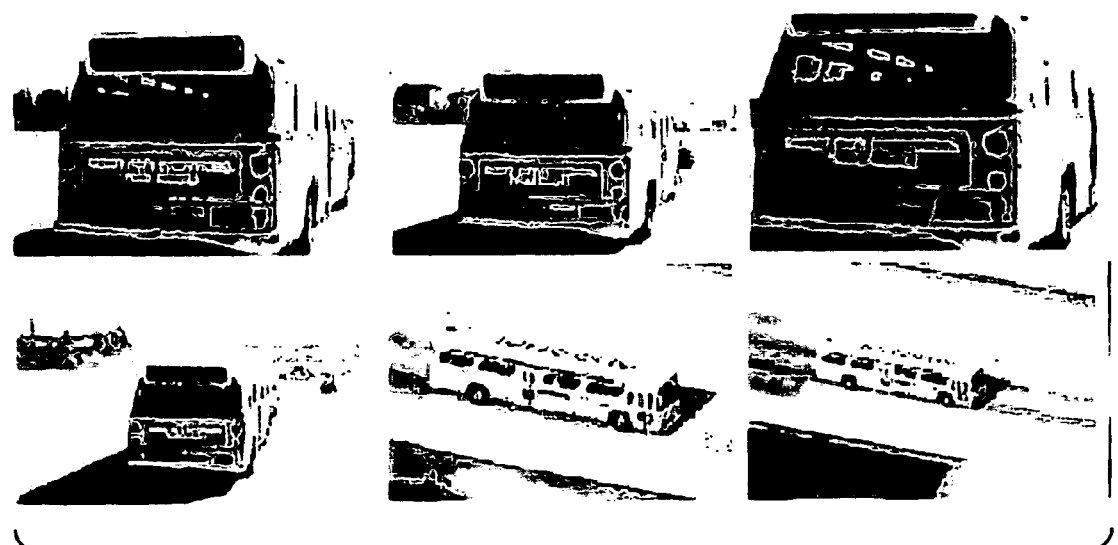
FIG. 6 depicts examples of visually-identified similar images.

The test dataset consisted of 50K randomly collected World Wide Web images. Among these images we identified 100 images as query images. For each query image, we generated 24 similar images using the transformation methods described herein. We also visually identified 5 similar images for each query image. (See FIG. 6 for examples of visually-identified similar images).

Figure 7:
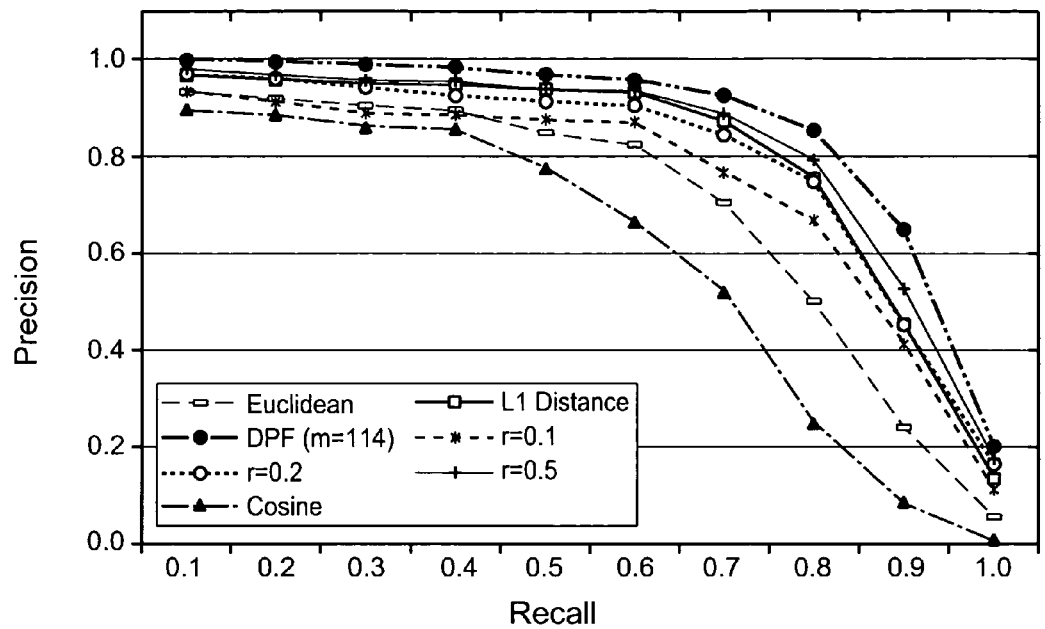
FIG. 7 compares the search performance of DPF and other traditional distance functions with precision-recall curves with training with the similar images shown in FIG. 6.

We conducted 100 queries using the 100 query images. For each query, we recorded the distance ranks of its similar images. For DPF, we fixed m value as 114 based on the training results in herein. FIG. 7 depicts the experimental results. The precision-recall curves in the figure shows that the search performance of DPF is significantly better than the other traditional distance functions. For instance, to achieve a recall of 80%, the retrieval precision of DPF is 84%, whereas the precision of the $L_1$ distance, the Euclidean distance, and the histogram Cosine distance is 70%, 50%, and 25%, respectively. DPF also works consistently better than the best setting, r=0.5, of the fractional function.

Figure 8:
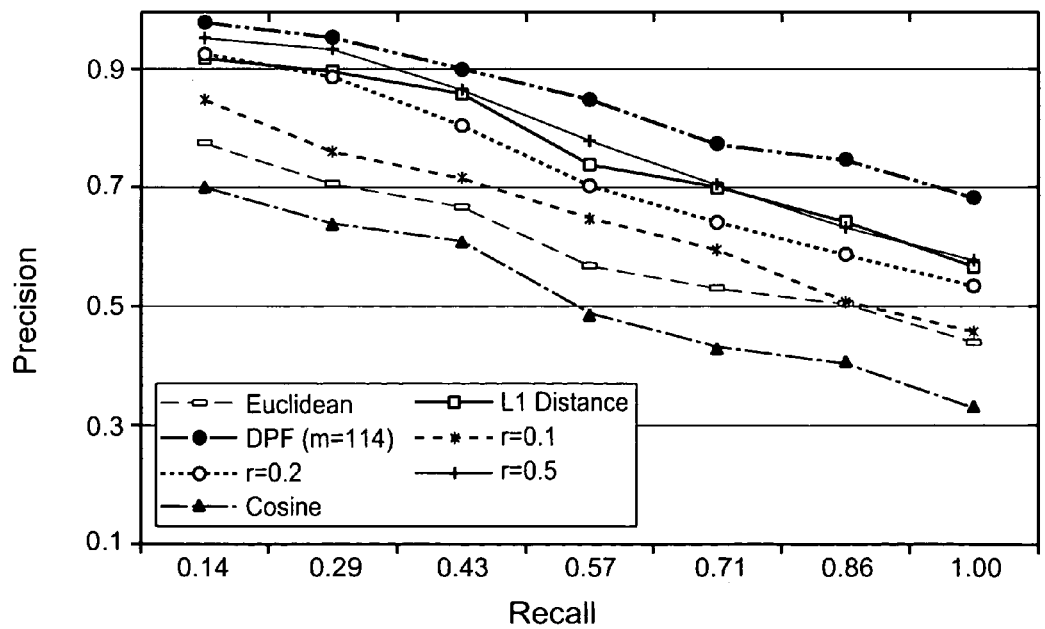
FIG. 8 compares the search performance of the DPF and other traditional distance functions with precision-recall curves without training with the similar images shown in FIG. 6.

We were particularly interested in the retrieval performance of the visually identified similar images, which were not included within the training-image dataset. FIG. 8 compares the retrieval performance of DPF and traditional distances for the visually identified similar images. The precision-recall curves indicate that, even though the visually identified similar images were not included in the training-image dataset, DPF could still find them effectively in the testing phase. This indicates that the trained DPF parameters can be generalized to find similar images produced by methods other than those for producing the training dataset.

3.2 Video Shot-Transition Detection

To further examine the generality of the DPF, we experimented DPF in another application video shot-transition detection. In essence, each video frame is an object that can be characterized by a set (or vector) comprising quantifiable features.

Our video dataset consisted of 150 video clips which contained thousands of shots. The videos covered following subjects:

Cartoon: 30 clips, each clip lasting for 50 seconds (from commercial CDs).

Comedy: 50 clips, each lasting for up to 30 seconds, see, home.enter.vg/funnyvideos/nogrpage.html.

Documentary: 70 clips, each lasting for two to five minutes, see, wwwnlpir.nist.gov/projects/t01v/t01v.html.

For characterizing a frame, we extracted the same set of 144 features for each frame, since these features can represent images to a reasonable extent. Our experiments had two goals. The first was to find the optimal parameter m settings for DPF. The second was to compare the shot detection accuracy between employing DPF and employing the Minkowski metric as the inter-frame distance function.

3.2.1 Parameter m

We fixed r=2 in our empirical study. Then we took a machine learning approach to train the value of m. We sampled 40% of the video clips as the training data to discover a good m. We then used the remaining 60% of video clips as testing data to examine the effectiveness of the learned m.

Figure 9:
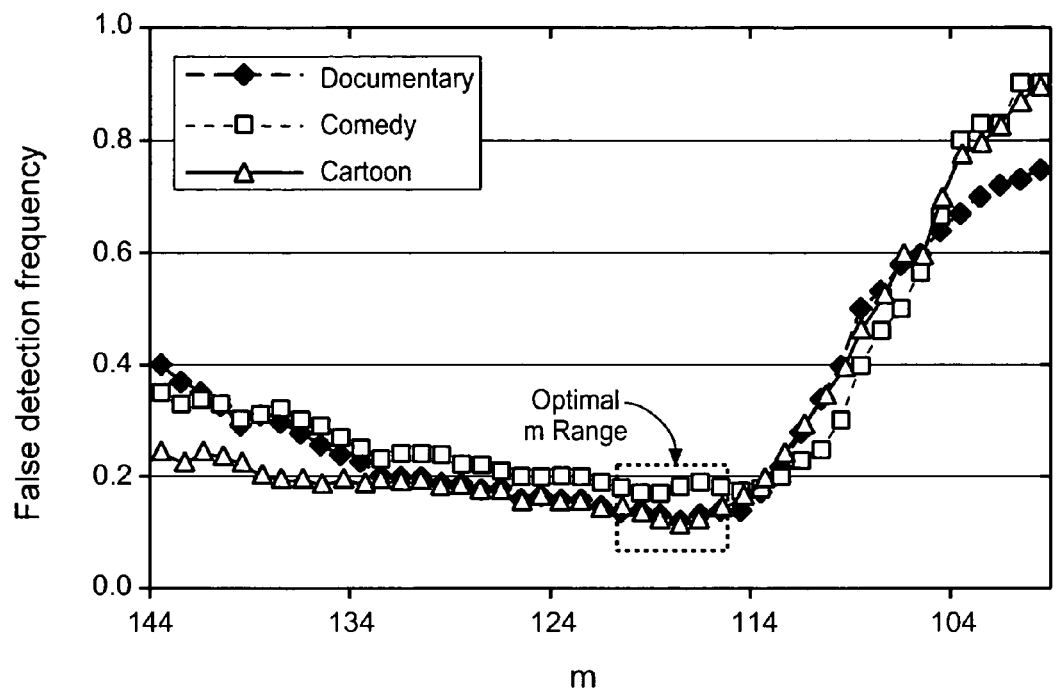
FIG. 9 deplcts the felse detection rate of three different video sets (i.e., documentaiy, comedy, and cartoon) according to the value of m for the DPF.

In the training phase, we labeled the accurate positions of shot boundaries. We then experimented with different values of m on three video datasets (cartoon, comedy, and documentary). FIG. 9 shows that for all three video types, the false detection rates are reduced to a minimum as m is reduced from 144 to between 115 and 120. (Recall that when m=144, DPF degenerates into the Minkowski distance function.) It is evident that the Minkowski distance function is not the best choice for our purpose.

3.2.2 DPF vs. Minkowski

Figure 10:
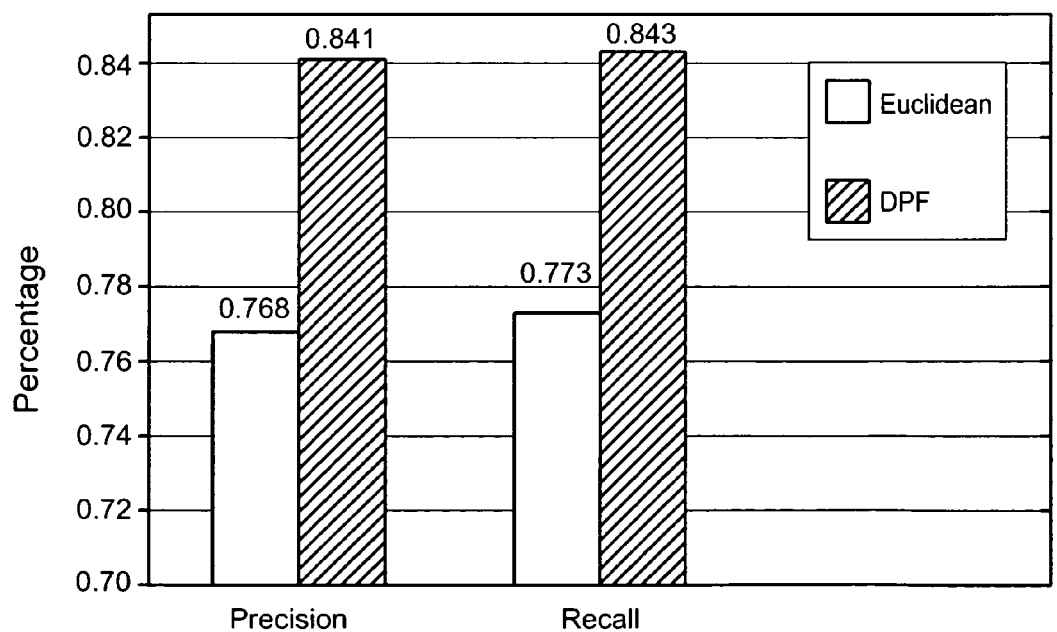
FIG. 10 compares the DPF and the Euclidean distance function average precision and recall rates for all video categories to illustrate DPF improvement in detection accuracy.

We next compared two inter-frame distance functions, DPF and Euclidean, on the testing data. For DPF, we set m=117 based on the training results in herein. Table 2 shows that DPF improves the detection accuracy over the Euclidean distance function on both precision and recall for all video categories. The average improvement as shown in FIG. 10 is about 7% in both recall and precision. In other words, for every 100 shot transitions to be detected, DPF makes 7 fewer detection errors, a marked improvement.

Figure 11A:
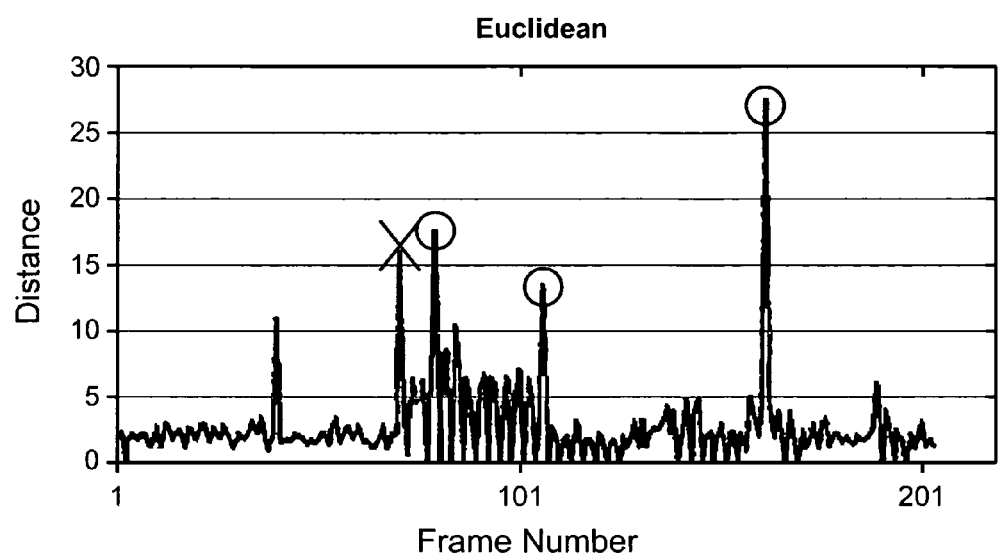
FIG. 11(a) depicts a misidentified shot boundary in feature distances by the Eudlidean distance function in a video.
Figure 11B:
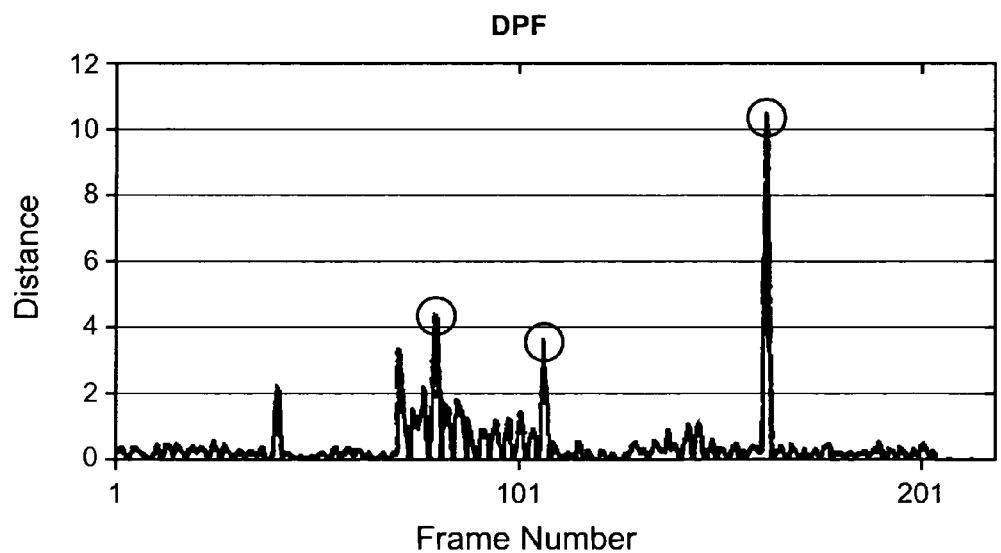
FIG. 11(b) depicts correctly identified shot boundaries in feature distances by the DPF for the same video as in FIG. 11(a).

FIGS. 11(a)–(b) illustrate why DPF can better detect shot boundaries than Euclidean distance, from the signal/noise ratio perspective. The x-axis of the figure depicts the frame number; the y-axis depicts the inter-frame distance between the insert and the insert frames. We mark each real shot boundary with a circle and a false detection with a cross. FIG. 11(a) shows that the Euclidean distance function identified four shot boundaries, in which the left-most one was a false positive. FIG. 11(b) shows that DPF separates the distances between shot boundaries and non-boundaries better, and hence eliminates the one misdetection. DPF improves the signal/noise ratio, and therefore, it is more effective in detecting shot transitions.

TABLE 3

Precision and Recall.

| Distance Functions | Video Type | Comedy | Cartoon | Documentary |
|---|---|---|---|---|
| Euclidean | # of Shot Boundaries | 425 | 167 | 793 |
| | # of false | 93 | 39 | 192 |
| | # of miss | 97 | 37 | 183 |
| | Precision | 78.1% | 76.6% | 75.8% |
| | Recall | 77.2% | 77.8% | 76.9% |

TABLE 3-continued

Precision and Recall.

| Distance Functions | Video Type | Comedy | Cartoon | Documentary |
|---|---|---|---|---|
| DPF | # of false | 61 | 26 | 140 |
|  | # of miss | 67 | 25 | 129 |
|  | Precision | 85.6% | 84.4% | 82.3% |
|  | Recall | 84.2% | 85.0% | 83.7% |

3.3 Weighted DPF vs. Weighted Euclidean

Figure 12:
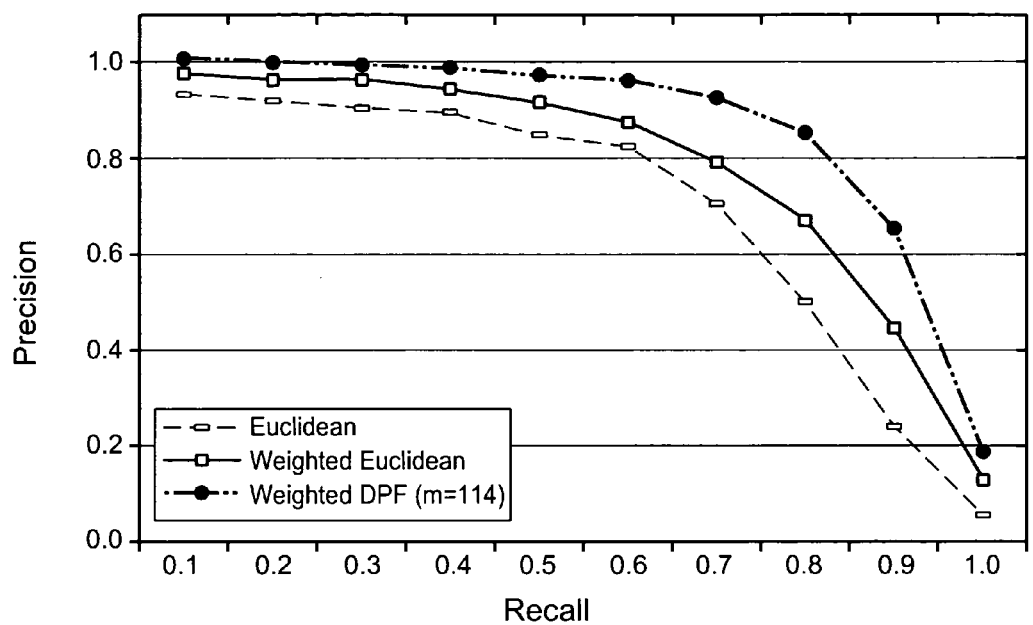
FIG. 12 compares the weighted Euclidean distance function and the weighted DPF precision-recall curves of features weighted by its variance among similar images.

We were also interested in applying weighted DPF to improve the weighted Minkowski distance function, which has been used extensively to personalize similarity measures. For weighted Minkowski distance, a weighting vector is learned for each query. Usually, the weight of a feature is set as the inverse of the variance of its values among similar images. Here, we allowed the weighted Euclidean distance function to work under the ideal condition that is, it knows all similar images a priori and can compute the ideal weighting vector for each query. FIG. 12 shows that the weighted Euclidean function outperforms its unweighted counterpart. This result confirms that the weighted version, see, M. Ortega, Y. Rui, K. Chakrabarti, S. Mehrotra, and T. S. Huang, Supporting similarity queries in mars, *Proc. of ACM Conf. on Multimedia*, 1997, and K. Porkaew, S. Mehrota, and M. Ortega, Query reformulation for content based multimedia retrieval in mars, *ICMCS*, pages 747–751, 1999, is indeed a better choice than the unweighted version (provided that the appropriate weighting can be learned). However, there is still much room for improvement. When we applied weighted DPF using the same weighting vector, its retrieval performance was better than that of the weighted Euclidean distance function. For instance, at 80% recall rate, the retrieval precision of the weighted Euclidean distance is about 68%, whereas the weighted DPF could achieve a precision of above 85%.

3.4 Observations

We summarize the results of our experiments as follows:
1. DPF is more effective than some most representative distant functions used in the CBIR community (e.g., Minkowski-like histogram Cosine distance functions) for measuring image similarity and for detecting shot transitions.
2. The weighted version of DPF outperforms the weighted version of the Euclidean distance function.
3. We believe that DPF can be generalized to find similar images of some other ways, and that DPF can be effective when a different set of low-level features are employed. Our belief is partially supported by our empirical results, and partially justified by similar theories in cognitive science, which we discuss next.

4. Hardware System

FIGS. 13(*a*)–(*b*) depict representative computer hardware environments that may be used to implement an image or videoframe comparison system in accordance with the present invention. FIG. 13(*a*) depicts a single computer system 400 comprising a CPU 410, memory 412, memory media 414, network interface 416, and input/output devices 418 all connected via a data and control signal bus 420. Such a computer configuration is widely known in the art. The CPU 410 executes instructions using instructions and data stored in the memory 412 and accessed by the CPU 410 using the signal bus 420. Memory 412 may comprise combinations of RAM and ROM. The CPU 410 in a multiprocessing or parallel processing computer system may comprise multiple individual CPU's, and likewise its memory 412 may comprise multiple sections, each accessible or inaccessible to some combination of the individual CPU's.

Instructions and data may transfer between the CPU 410 or memory 412, and the memory media 414, network interface 416, and I/O devices 418 using the signal bus 420. Memory media 414 may comprise devices employing, e.g., magnetic, optical, magneto-optical, or other recording techniques for reading and/or writing to tape, disk, cartridge or other media. I/O devices 418 may comprise keyboards, pointing devices, video displays, printers, speakers, scanners, cameras, accelerator cards, supplemental processor cards, or other peripherals through which a user may interface with the computer system or which may extend the processing functionality of the computer system. The network interface 416 may comprise, e.g., network interface cards or modems which permit the computer 400 to establish data communication with other computer systems.

FIG. 13(*b*) depicts multiple individual computer systems 401, 402, like the one 400 illustrated in FIG. 13(*a*), coupled by an electronic data communications network 490. The network 490 allows the individual computer systems 401, 402 to exchange data. Further, software on the individual computer systems 401, 402 may employ exchanged data to represent service requests and responses, allowing the individual computers 401, 402 to cooperate in the processing of a workload. Such cooperative processing is well known in the art and may take many forms, e.g., peer-to-peer, client-server, multi-tiered, parallel-processing architecture, and combinations.

Various modifications to the preferred embodiments can be made without departing from the spirit and scope of the invention. Thus, the foregoing description is not intended to limit the invention which is described in the appended claims.

The invention claimed is:

1. A method of measuring similarity of a first object represented by first set of feature values to a second object represented by a second set of feature values, comprising:
   determining respective feature distance values between substantially all corresponding feature values of the first and second sets of feature values;
   selecting a subset of the determined feature distance values in which substantially all feature distance values that are selected to be within the subset are smaller in value than feature distance values that are not selected to be within the subset; and
   summing the feature distance values in the subset to produce a partial feature distance measure between the first and second objects.

2. The method of claim 1 further including:
   scaling the partial feature distance measure to achieve maximum separation between similar and different objects.

3. A method of measuring similarity of a first object X represented by feature values $\{x_1, x_2, x_3, \ldots x_p\}$ in a feature set, to a second object Y represented by second feature values in the feature set $\{y_1, y_2, y_3, \ldots y_p\}$, comprising:
   determining respective feature distance values $\delta_i$ between substantially all corresponding feature values $x_i$ and $y_i$ in accordance with a relationship, $$\delta_i = |x_i - y_i|$$

herein $x_i$ and $y_i$ are respective feature values for the respective first and second objects of the ith feature of the feature set;

selecting a subset $\Delta_m$ including feature distance values in which substantially all feature distance values that are selected to be within the subset are smaller in value than feature distance values that are not selected to be within the subset; and producing a partial feature distance measure between the first and second objects by combining the selected feature distance values in the subset $\Delta_m$ in accordance with a relationship, $$d(m, r) = \left(\sum_{\delta_i \in \Delta_m} \delta i^r\right)\frac{1}{r}$$

where r is a scaling factor, and m is the number of feature values in the subset $\Delta_m$.

4. The method of claim 3 wherein the first and second objects include respective first and second images.

5. The method of claim 3 wherein, the first and second objects include respective first and second images; and the feature set includes color features and texture features.

6. The method of claim 3 wherein,
the first and second objects include respective first and second images; and the feature set includes color features and texture features and shape features.

7. The method of claim 3 wherein the first and second objects include respective first and second video frames.

8. The method of claim 3 wherein,
the first and second objects include respective first and second video frames; and the feature set includes color features and texture features.

9. The method of claim 3 wherein,
the first and second objects include respective first and second video frames; and
the feature set includes color features and texture features and shape features.

10. The method of claim 3,
wherein selecting a subset $\Delta_m$ includes selecting a prescribed number of features distance values, m, to be within the subset; and
wherein m<p.

11. The method of claim 3,
wherein selecting a subset $\Delta_m$ includes only selecting respective feature distance values that satisfy a prescribed threshold to be within the subset.

12. A method of measuring similarity of a target object X represented by feature values $\{x_1, x_2, x_3, \ldots x_p\}$ in a feature set, to a each of multiple respective sample objects $\{Y_1, \ldots Y_N\}$ represented by respective second feature values in the feature set $\{y_1, y_2, y_3, \ldots y_p\}$, comprising: determining feature respective distance values $\delta_i$ between substantially all corresponding feature values $x_i$ and $y_i$ in accordance with a relationship, $$\delta_i = |x_i - y_i|$$

wherein $x_1$ and $y_1$ are respective feature values for the respective first and second objects of the ith feature of the feature set;

identifying respective feature distance value subsets $\{\Delta_{m1}, \ldots \Delta_{mN}\}$ corresponding to respective sample objects $\{Y_1, \ldots Y_N\}$;
wherein substantially all feature distance values that are selected to be within a respective feature distance value subset corresponding to a respective sample object are smaller in value than respective feature distance values corresponding to that same respective sample object that are not selected to be within the respective feature distance value subset for that respective sample object; and producing respective partial feature distance measures between the target object X and respective sample objects $\{Y_1, \ldots Y_N\}$ by combining respective selected feature distance values of the respective feature distance value subsets $\{\Delta_{m1}, \ldots \Delta_{mN}\}$ in accordance with a relationship, $$d(m, r) = \left(\sum_{\delta_i \in \Delta_m} \delta i^r\right)\frac{1}{r}$$

where r is a scaling factor, and m is the number of feature values in the subset $\Delta_m$.

13. The method of claim 12 wherein the target object includes an image and the respective sample objects include images.

14. The method of claim 12 wherein, the target object includes an image and the respective sample objects include images; and the feature set includes color features and texture features.

15. The method of claim 12 wherein the target object includes an image and the respective sample objects include images; and the feature set includes color features, texture features and shape features.

16. The method of claim 12 wherein the target object includes an image and the respective sample objects include video frames.

17. The method of claim 12 wherein,
the target object includes an image and the respective sample objects include video frames; and the feature set includes color features and texture features.

18. The method of claim 12 wherein,
the target object includes an image and the respective sample objects include video frames; and the feature set includes color features, texture features and shape features.

19. The method of claim 12,
wherein selecting a subset $\Delta_m$ includes selecting a prescribed number of features distance values, m, to be within the subset; and wherein m<p.

20. The method of claim 12,
wherein selecting a subset $\Delta_m$ includes only selecting respective feature distance values that satisfy a prescribed threshold to be within the subset.

21. A process to determine an optimal number of object features to use in comparing a first object and a second object:
a. providing a multiplicity of respective seed objects;
b. providing a respective set of p feature values for each respective seed object;
c. providing a plurality of respective transformations for each respective seed object;
d. providing a respective set of p feature values for each respective transformation of each respective seed object;
e. for each of a multiplicity of seed object selections and for each of a plurality of different values for m,
i. selecting a respective seed object;
ii. selecting a respective value of m<p;

iii. producing respective first partial distance measures between respective feature values of a respective set of p feature values for the respective selected seed object and respective feature values of respective transformations of that same respective selected seed object in accordance with the relationship, $$d(m, r)_1 = \left( \sum_{\delta_i \in \Delta_{m1}} \delta_{i1}^r \right)^{\frac{1}{r}}$$

where $\Delta_{m1}$ represents constituents of a set of the m smallest feature distance values $\delta_{i1}$, for the first partial distance measure, and r is a scaling factor; and iv. producing respective second partial distance measures between respective feature values of the respective set of p feature values for the respective selected seed object and respective feature values of respective sets of p feature values produced for respective transformations of a multiplicity of the other respective seed objects, in accordance with the relationship, $$d(m, r)_2 = \left( \sum_{\delta_i \in \Delta_{m2}} \delta_{i2}^r \right)^{\frac{1}{2}}$$

where $\Delta_{m2}$ represents constituents of a set of the m smallest feature distance values $\delta_{i2}$, for the first partial distance measure, and r is a scaling factor; and f. choosing a value of m that on average produces first partial distance measures that are less than second partial distance measures and that on average produces a largest separation between first and second partial distance measures.

22. A process to determine an optimal number of object features to use in comparing a first object and a second object:

a. providing a multiplicity of respective seed objects;
b. providing a respective set of p feature values for each respective seed object;
c. providing a plurality of respective transformations for each respective seed object;
d. providing a respective set of p feature values for each respective transformation of each respective seed object;

e. for each of a multiplicity of seed object selections and for each of a plurality of different threshold feature distance values, i. selecting a respective seed object;
ii. selecting a respective threshold feature distance value; and
iii. producing respective first partial distance measures between respective feature values of a respective set of p feature values for the respective selected seed object and respective feature values of respective transformations of that same respective selected seed object in accordance with the relationship, $$d(m, r)_1 = \left( \sum_{\delta_i \Sigma \Delta_{m1}} \delta_{i1}^r \right)^{\frac{1}{r}}$$

where $\Delta_{m1}$ represents constituents of a set including only those feature distance values $\delta_{i1}$, that satisfy the respective threshold distance feature value, and r is a scaling factor;

iv. producing respective second partial distance measures between respective feature values of the respective set of p feature values for respective seed object and respective feature values of respective sets of p feature values produced for respective transformations of a multiplicity of the other respective seed objects, in accordance with the relationship, $$d(m, r)_2 = \left( \sum_{\delta_i \in \Delta_{m2}} \delta_{i2}^r \right)^{\frac{1}{2}}$$

where $\Delta_{m2}$ represents constituents of a set including only those feature distance values $\delta_{i2}$, that satisfy the respective threshold distance feature value, and r is a scaling factor; and f. choosing a threshold value that on average produces first partial distance measures that are less than second partial distance measures and that on average produces a largest separation between first and second partial distance measures.

* * * * *